(12) United States Patent
Hasija et al.

(10) Patent No.: US 10,831,633 B2
(45) Date of Patent: Nov. 10, 2020

(54) METHODS, APPARATUSES, AND SYSTEMS FOR WORKFLOW RUN-TIME PREDICTION IN A DISTRIBUTED COMPUTING SYSTEM

(71) Applicant: Optum Technology, Inc., Eden Prairie, MN (US)

(72) Inventors: Love Hasija, Sonepat (IN); Piyush Gupta, Bangalore (IN)

(73) Assignee: Optum Technology, Inc., Eden Prairie, MN (US)

( * ) Notice: Subject to any disclaimer, the term of this patent is extended or adjusted under 35 U.S.C. 154(b) by 84 days.

(21) Appl. No.: 16/146,434

(22) Filed: Sep. 28, 2018

(65) Prior Publication Data
US 2020/0104230 A1 Apr. 2, 2020

(51) Int. Cl.
*G06F 15/173* (2006.01)
*G06F 11/34* (2006.01)
(Continued)

(52) U.S. Cl.
CPC .......... *G06F 11/3452* (2013.01); *G06F 9/505* (2013.01); *G06F 11/3006* (2013.01);
(Continued)

(58) Field of Classification Search
CPC .. G06F 11/3452; G06F 9/505; G06F 11/3006; G06F 11/3072; G06F 11/3414;
(Continued)

(56) References Cited

U.S. PATENT DOCUMENTS 8,380,557 B2 2/2013 Moon et al.
8,850,514 B2 9/2014 McGrath et al.
(Continued)

OTHER PUBLICATIONS

Zaharia et al., "Improving MapReduce Performance in Heterogeneous Environments," 8th USENIX Symposium on Operating Systems Design and Implementation, vol. 8. No. 4., (2008), pp. 29-42.
(Continued)

*Primary Examiner* — Liang Che A Wang
(74) *Attorney, Agent, or Firm* — Alston & Bird LLP

(57) ABSTRACT

A method, apparatus and computer program product predict run-time to completion of workflows executing in a shared multi-tenant distributed compute clusters. The method, apparatus and computer program product receive a MapReduce workflow. The MapReduce workflow includes one or more MapReduce jobs for execution. The method, apparatus and computer program product generates one or more workflow profile summary reports for one or more currently executing workflows on the multi-tenant distributed computing system; generates one or more compact historical workflow profile summary reports of the received MapReduce workflow and the one or more currently executing workflows using the historical reports; generates one or more compact historical cluster contention summary reports of all workflow executing compute clusters in the multi-tenant distributed computing system; and generates a run-time prediction for the MapReduce workflow based at least in part on the one or more currently executing workflow profile summary reports, one or more compact historical workflow profile summary reports, and the one or more compact historical cluster contention summary reports.

25 Claims, 24 Drawing Sheets

(51) Int. Cl.
  *G06F 11/30* (2006.01)
  *H04L 29/08* (2006.01)
  *G06F 9/50* (2006.01)
(52) U.S. Cl.
  CPC ...... *G06F 11/3072* (2013.01); *G06F 11/3414* (2013.01); *G06F 11/3419* (2013.01); *G06F 11/3433* (2013.01); *G06F 11/3457* (2013.01); *H04L 67/30* (2013.01); *G06F 2209/508* (2013.01); *G06F 2209/5019* (2013.01)
(58) Field of Classification Search
  CPC ... G06F 11/3419; G06F 11/3457; H04L 67/30
  USPC .................................................. 709/223, 224
  See application file for complete search history.

(56) References Cited

U.S. PATENT DOCUMENTS

| | | | |
|---|---|---|---|
| 9,274,898 | B2 | 3/2016 | Boldyrev et al. |
| 9,430,280 | B1 | 8/2016 | Shih et al. |
| 9,661,071 | B2 | 5/2017 | Manglik et al. |
| 9,792,325 | B2* | 10/2017 | Bruno ................ G06F 16/2453 |
| 9,823,626 | B2 | 11/2017 | Zornio et al. |
| 9,886,670 | B2 | 2/2018 | Dirac et al. |
| 10,460,241 | B2* | 10/2019 | Chou ..................... H04L 67/32 |
| 2013/0226903 | A1 | 8/2013 | Wu et al. |
| 2014/0122546 | A1 | 5/2014 | Liao et al. |
| 2014/0215487 | A1* | 7/2014 | Cherkasova .......... G06F 9/5083 718/106 |
| 2014/0359624 | A1 | 12/2014 | Cherkasova et al. |
| 2016/0321310 | A1* | 11/2016 | Alshammari .......... G06F 16/23 |
| 2017/0017521 | A1* | 1/2017 | Gupta ................... G06F 9/5011 |
| 2017/0083579 | A1 | 3/2017 | Du et al. |
| 2017/0149875 | A1 | 5/2017 | Iyengar et al. |
| 2017/0213257 | A1 | 7/2017 | Murugesan et al. |
| 2017/0329824 | A1 | 11/2017 | Hu |
| 2018/0074855 | A1 | 3/2018 | Kambatla |
| 2018/0329741 | A1* | 11/2018 | Yuan ..................... G06F 9/4893 |

OTHER PUBLICATIONS

Wilhelm et al., "The Worst-Case Execution-Time Problem—Overview of Methods and Survey of Tools," Transactions on Embedded Computing Systems (TECS), vol. 7, Issue 3, (2008), pp. 1-52.
Wang et al., "Using Realistic Simulation for Performance Analysis of MapReduce Setups," Proceedings of the 1st ACM Workshop on Large-Scale System and Application Performance, Jun. 10, 2009, pp. 19-26.
Wang et al., "A Simulation Approach to Evaluating Design Decisions in MapReduce Setups," 2009 IEEE International Symposium on Modeling, Analysis & Simulation of Computer and Telecommunication Systems, (2009), 11 pages.
Verma et al., "ARIA: Automatic Resource Inference and Allocation for MapReduce Environments," Proceedings of the 8th IEEE International Conference on Autonomic Computing (ICAC 2011), (2011), 11 pages.
Tsai et al., "Service-Oriented Cloud Computing Architecture," 2010 Seventh International Conference on Information Technology, IEEE Computer Society, (2010), pp. 684-689.
Tian et al., "A Dynamic MapReduce Scheduler for Heterogeneous Workloads," 2009 Eighth International Conference on Grid and Cooperative Computing, (2009), pp. 218-224.
Stavrinides et al., "A Cost-Effective and QoS-Aware Approach to Scheduling Real-Time Workflow Applications in PaaS and SaaS Clouds," 2015 3rd International Conference on Future Internet of Things and Clouds, (2015), pp. 231-239.
Phan et al., "Real-Time Mapreduce Scheduling," University of Pennsylvania Scholarly Commons, Jan. 1, 2010, 8 pages.
Morton et al., "ParaTimer: A Progress Indicator for MapReduce DAGs," Proceedings of the 2010 ACM SIGMOD International Conference on Management of data, (2010), 12 pages.
Morton et al., "Estimating the Progress of MapReduce Pipelines," 2010 IEEE 26th International Conference on Data Engineering (ICDE 2010), (2010), 4 pages.
Mishra et al., "ConEx: A System for Monitoring Queries," Proceedings of the 2007 ACM SIGMOD International Conference on Management of Data. (2007), pp. 1076-1078.
Mishra et al., "A Lightweight Online Framework for Query Progress Indicators," 2007 IEEE 23rd International Conference on Data Engineering, (2007), 12 pages.
Luo et al., "Toward a Progress Indicator for Database Queries," Proceedings of the 2004 ACM SIGMOD International Conference on Management of Data, Jun. 13-18, 2004, 12 pages, Paris, France.
Luo et al., "Increasing the Accuracy and Coverage of SQL Progress Indicators," 21st International Conference on Data Engineering (ICDE'05), (2005), 12 pages, Tokyo, Japan.
Hasija, et al., "Estimating Runtime of MapReduce DAGs Executing on a Shared Multi-Tenant Hadoop Cluster," Research & Innovation, Optum Global Solutions, 16 pages.
Ganapathi et al., "Predicting Multiple Metrics for Queries: Better Decisions Enabled by Machine Learning," 2009 IEEE 25th International Conference on Data Engineering, IEEE, (2009), 12 pages.
Chaudhuri et al., "When Can We Trust Progress Estimators for SQL Queries?," 12 pages.
Chaudhuri et al., "Estimating Progress of Execution for SQL Queries," Proceedings of the 2004 ACM SIGMOD International Conference on Management of Data, (2004), pp. 803-814.
Azeez et al., "Multi-Tenant SOA Middleware for Cloud Computing," 2010 IEEE 3rd International Conference on Cloud Computing, (2010), pp. 458-465.

* cited by examiner

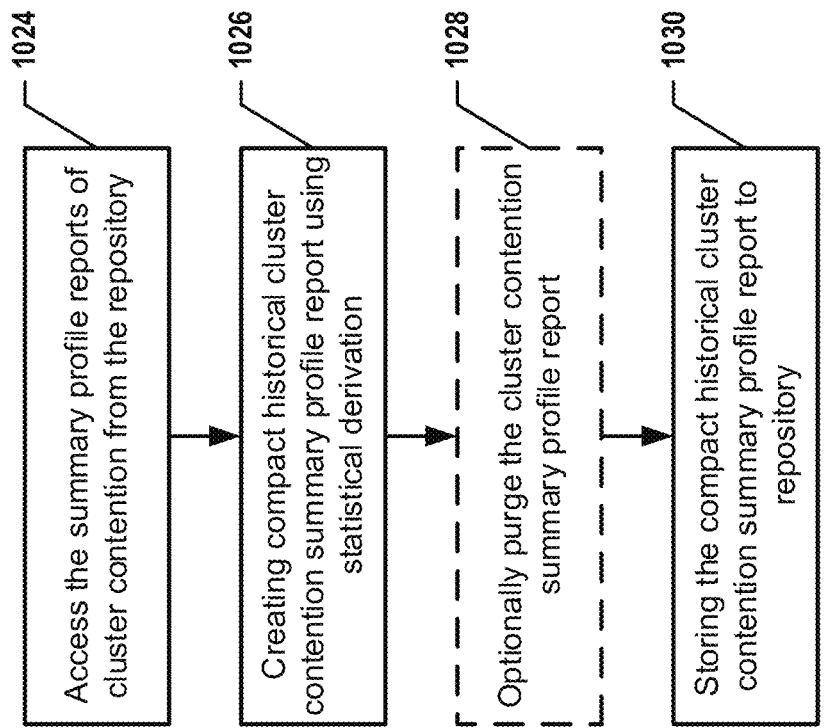

METHODS, APPARATUSES, AND SYSTEMS FOR WORKFLOW RUN-TIME PREDICTION IN A DISTRIBUTED COMPUTING SYSTEM

TECHNOLOGICAL FIELD

Example embodiments of the present invention relate generally to predicting run-times for workflows in distributed computing systems.

BACKGROUND

The inventors have discovered limitations with existing methods for predicting run-times for workflows in distributed computing systems, such as Hadoop or other MapReduce frameworks. Through applied effort, ingenuity, and innovation, the inventors have solved many of these identified limitations by developing a solution that is embodied by different embodiments of the present invention as described in detail below.

SUMMARY

Distributed computing platforms such as Hadoop or other MapReduce related frameworks operate on a cluster of computing entities, enabling large workloads to be processed in parallel and more quickly than is generally feasible with a single software instance operating on a single node. For example, MapReduce based distributed computing platforms uses software components for distributing the workload across a cluster of computing nodes. Examples may include the Hadoop scheduler and resource manager that allocate computational resources to different jobs based on a variety of configuration settings and operating workloads using algorithms such as first in first out (FIFO), Fair and Capacity, and/or the like.

In a multi-tenant parallel MapReduce processing environment, for example, the job or workflow execution times can have high variance due to unpredictable intra- and inter-tenant resource contention. Metrics such as estimated time to completion are important requirements for such a platform. Further, progress estimators offered by existing tools in MapReduce processing environments like Hadoop or other environments do not provide non-trivial progress estimates for parallel workflows executing in a shared multi-tenant settings.

Predicting execution time of MapReduce workloads is an increasingly important problem, motivated by the current surge of providing big data platform as a service (BDPaaS) in the cloud. To a multi-tenant BDPaaS provider, execution time prediction is crucial in offering service level agreements (SLAs), improving resource allocations, performance debugging, cluster tuning, capacity planning, managing, administrating and reporting, and/or the like.

As described herein, the inventors have developed a system and method for predicting run-time to completion of workflows executing in a shared multi-tenant distributed compute clusters. And while the application is described in a MapReduce context for ease in understanding, the innovations are not limited to this environment. In one embodiment, a MapReduce workflow constitutes a directed acyclic graph of one or more MapReduce jobs. Example embodiments of the system use workflows past performance characteristics, current executing performance characteristics, cluster past contention trends, current state of affair to derive the run-time estimates, and/or the like. Further, example embodiments of the system offer a number of run-time estimates for various possible run-time scenarios. Examples run-time estimates include the best case, worst case, executing case, statistical case, and/or the like with or without possibility of failures. Example embodiments can also pre-emptively predict the run-time of the workflows before scheduling to enable more indirect offline use cases like cluster tuning, resource planning, and/or the like.

Example embodiments of the system can be integrated with an existing multi-tenant shared distributed compute cluster to provide a set of interfaces to help users monitor the progress of their scheduled jobs and/or workflows and the expected completion times. Example of such interfaces might include web interfaces, mobile interfaces, and/or API interfaces for system-to-system communications.

Example direct usage of the system may include a notification system for anomalies, defining SLAs, monitoring progress, characterizing cluster performance, optimal scheduling, capacity planning, performance tuning, managing, administrating, and/or the like. Example embodiments of the system may also be used in conjecture with other systems in a multi-tenant computing system for aiding important decisions like automated improved resource allocations, automated advanced scheduling policies, and/or the like.

[To be Expanded Upon Approval of the Claims]

The above summary is provided merely for purposes of summarizing some example embodiments to provide a basic understanding of some aspects of the invention. Accordingly, it will be appreciated that the above described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1A:
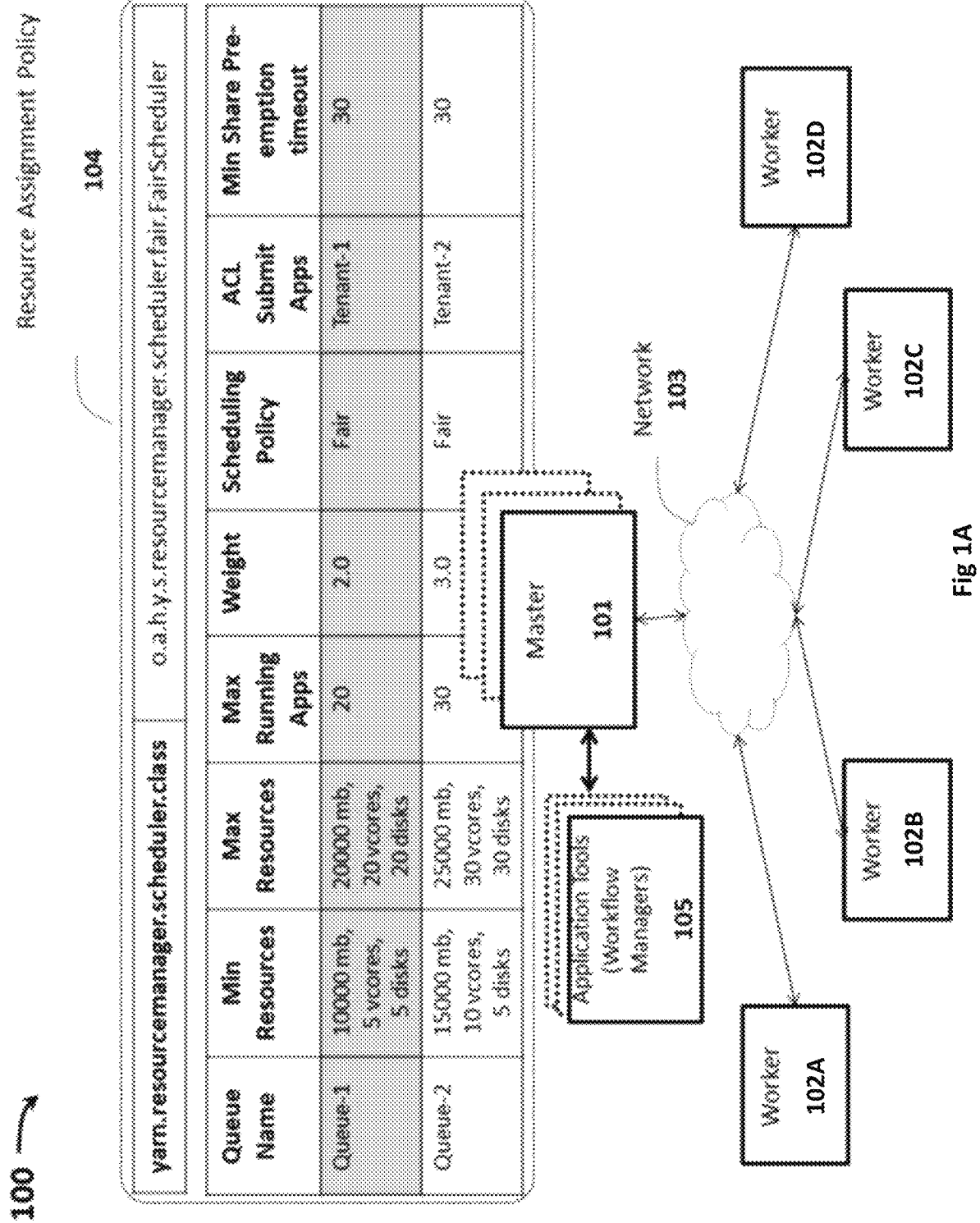
Figure 1B:
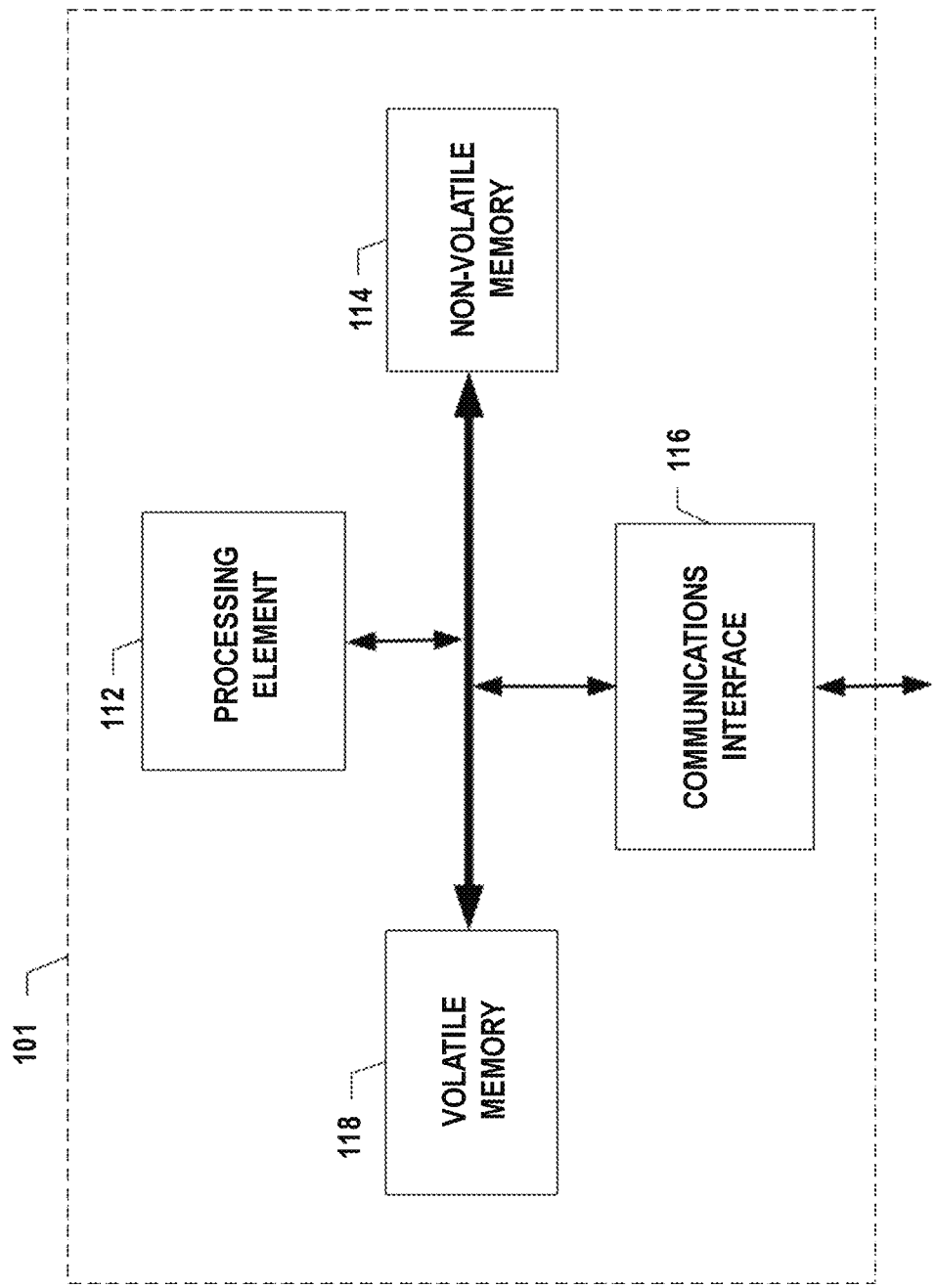
Figure 2:
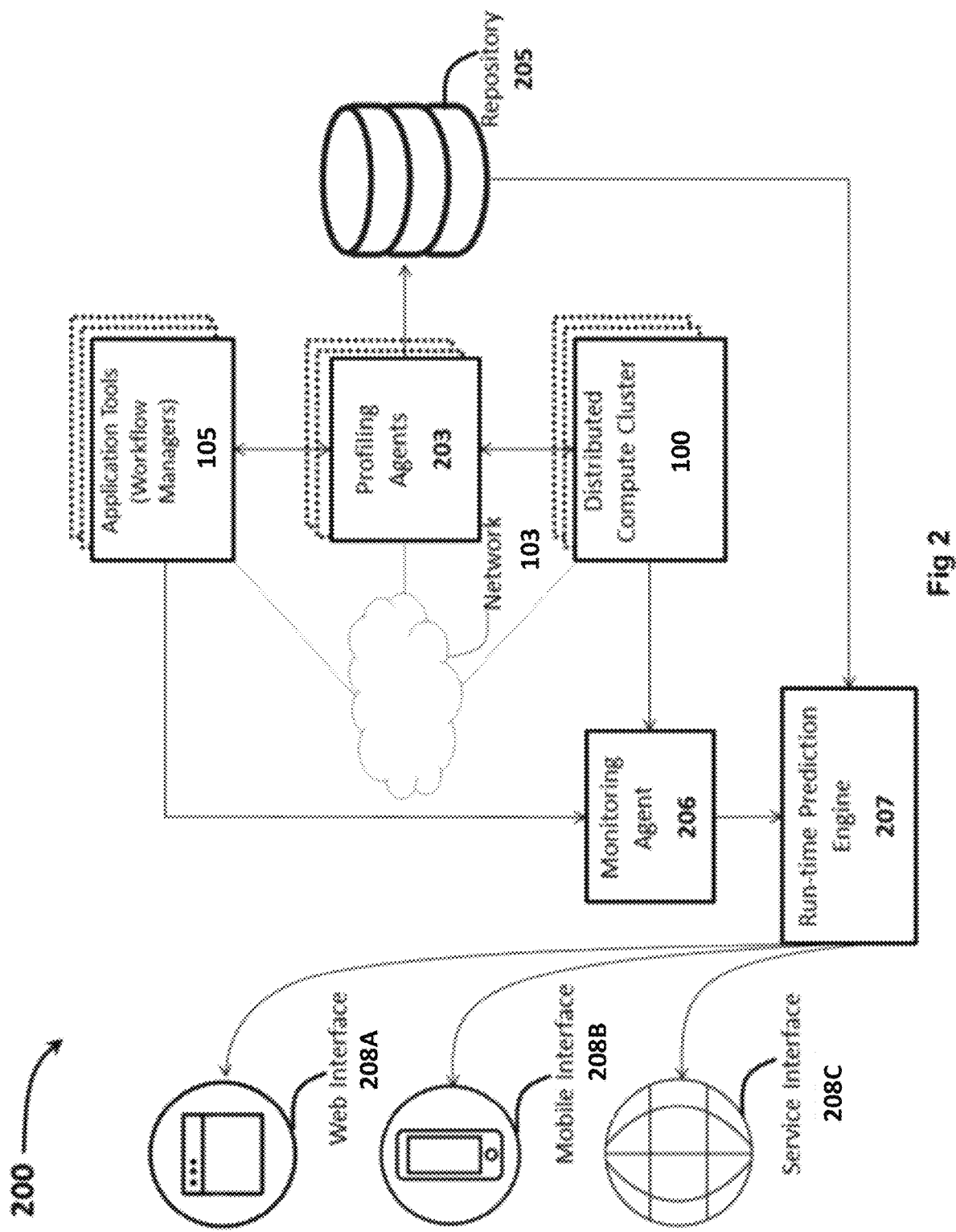
Figure 3:
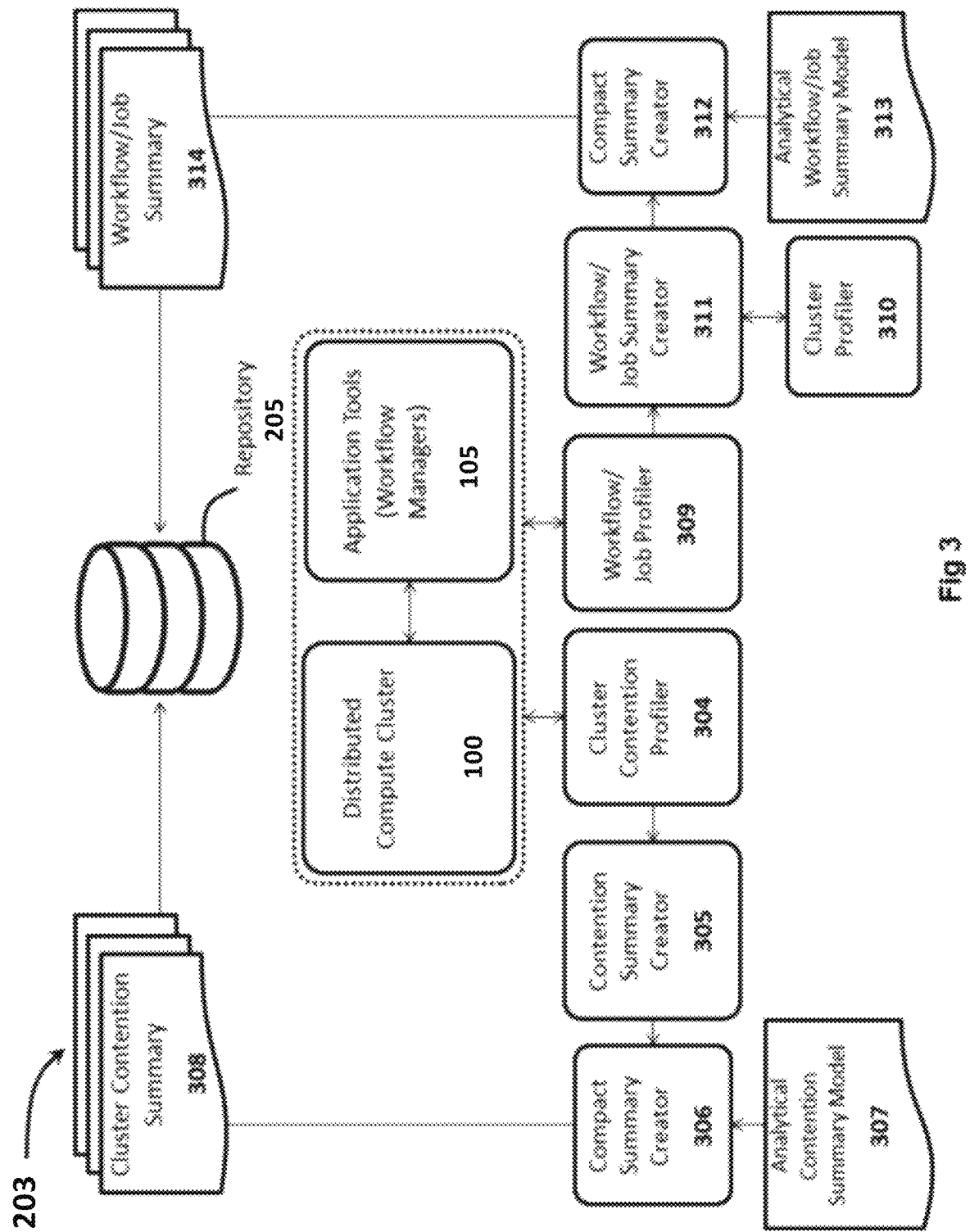
Figure 4:
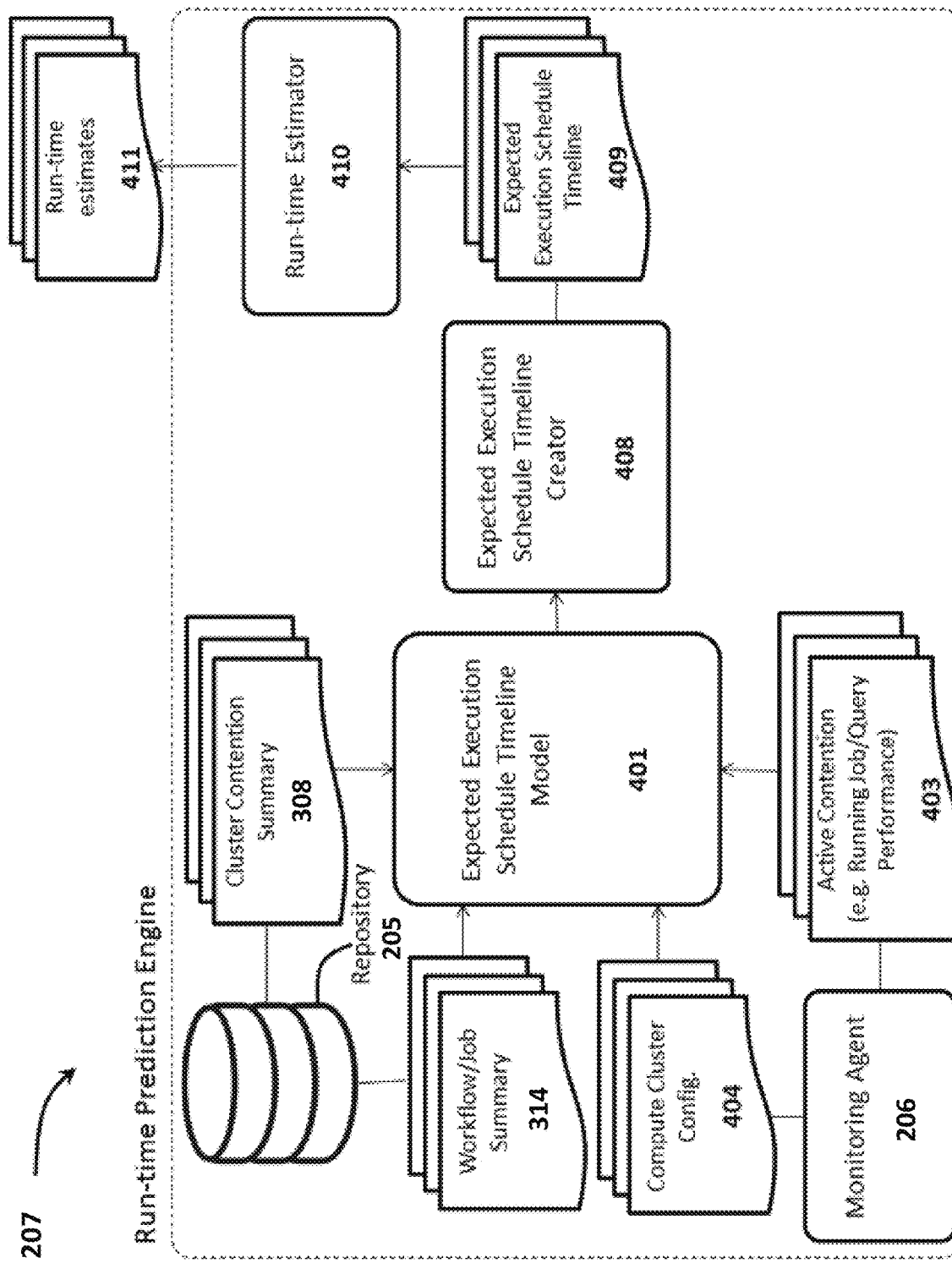
Figure 5:
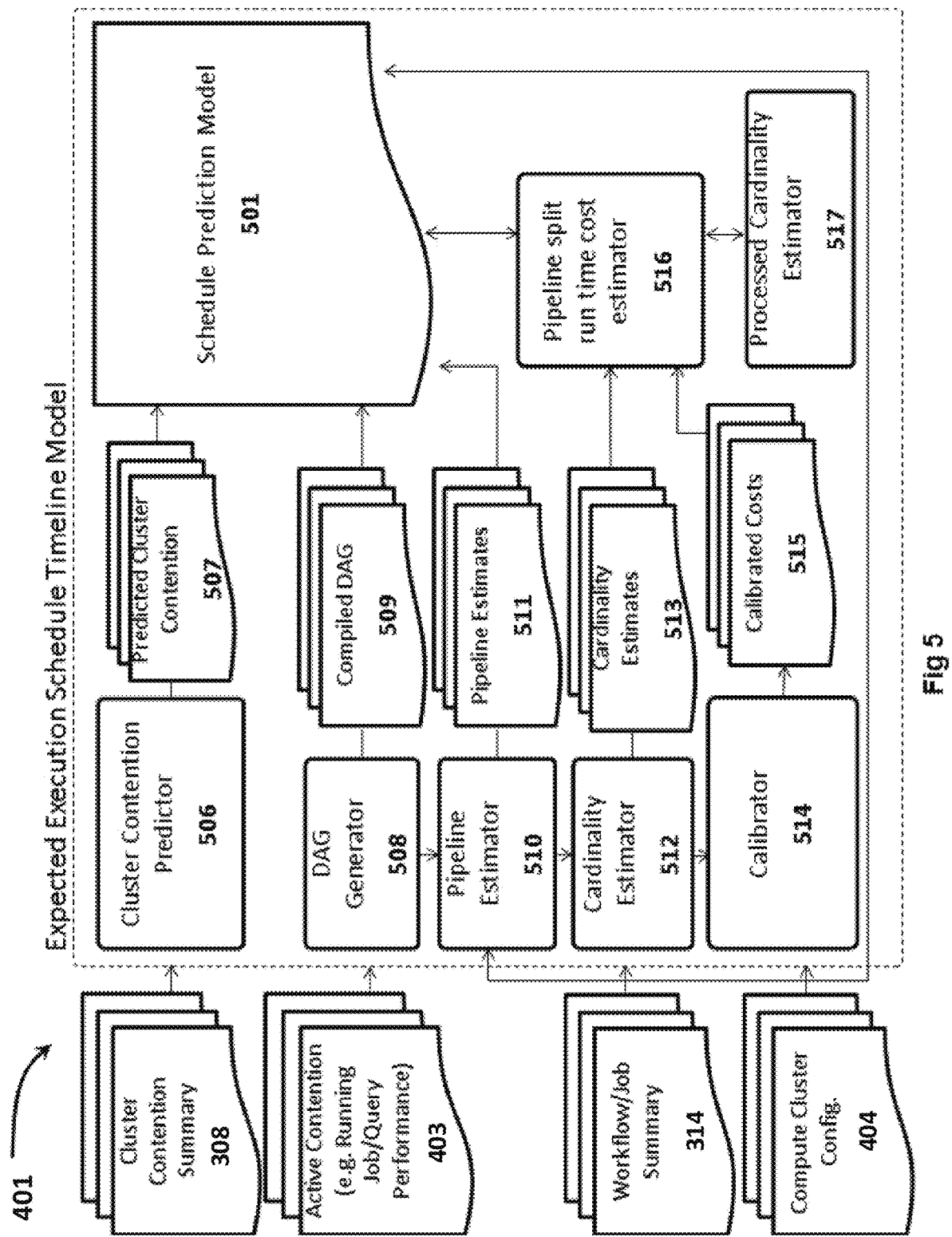
Figure 6:
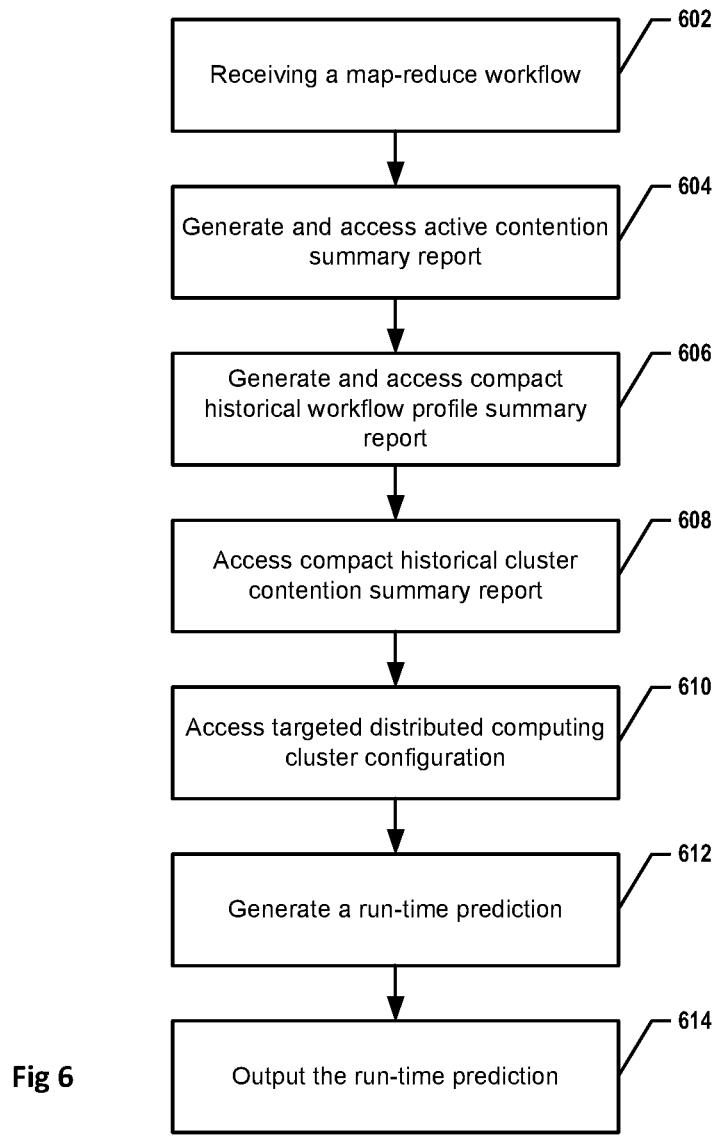
Figure 7A:
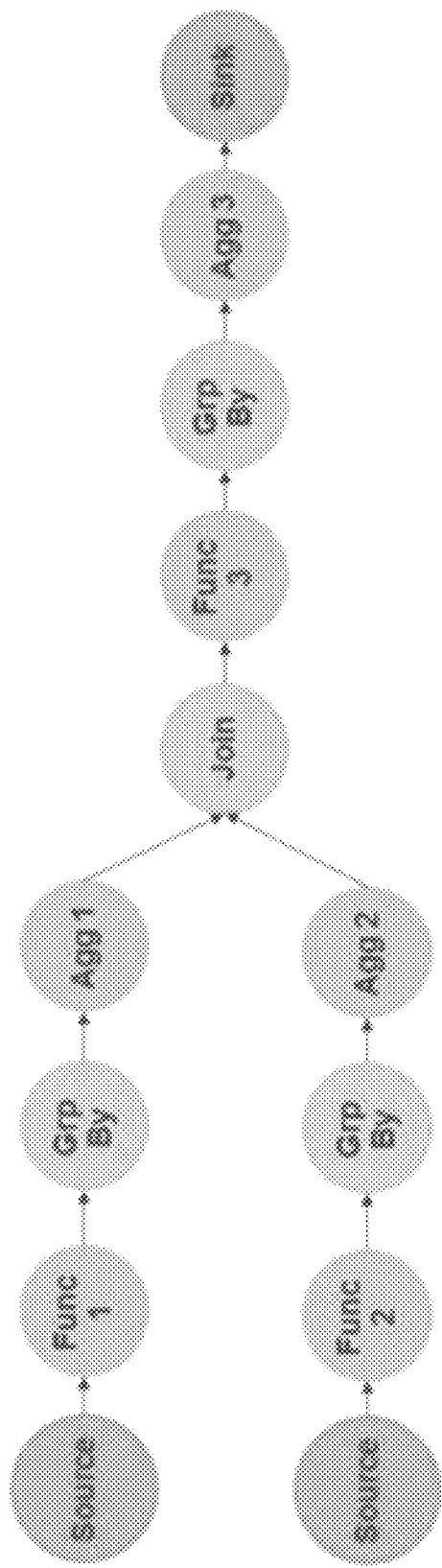
Figure 7B:
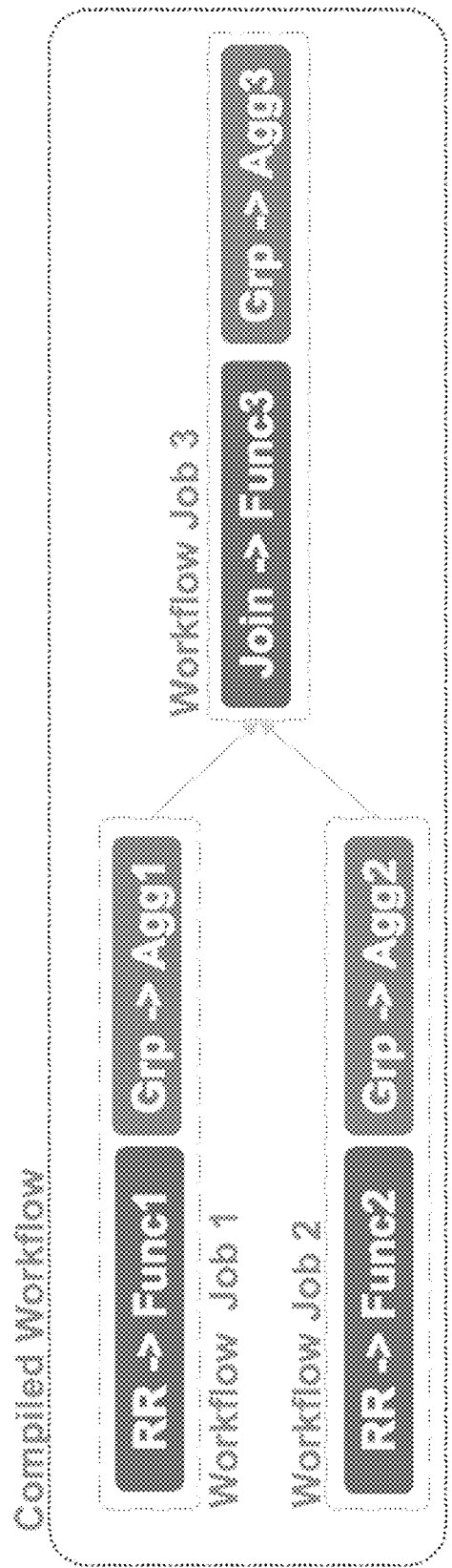
Figure 8:
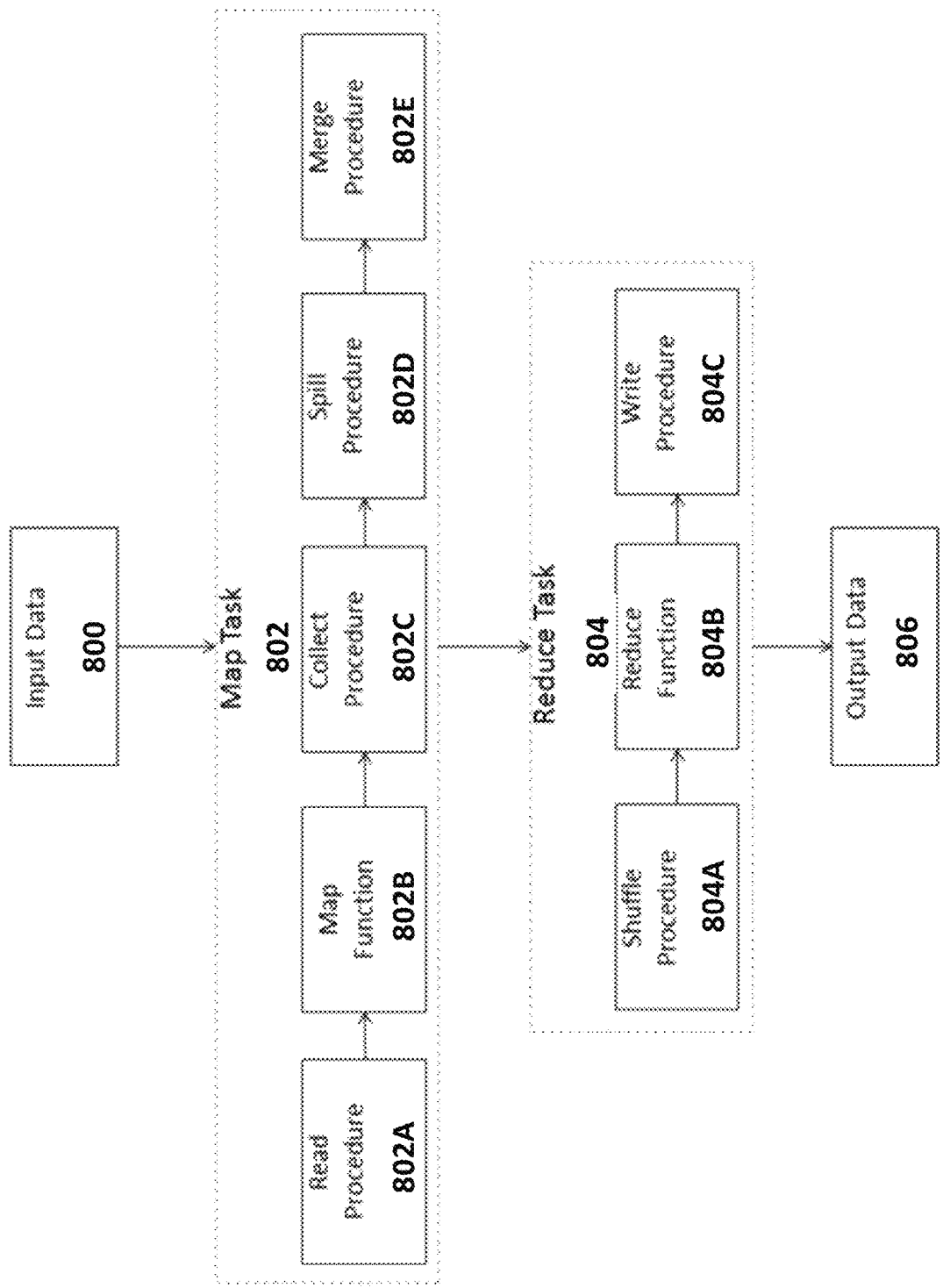
Figure 9:
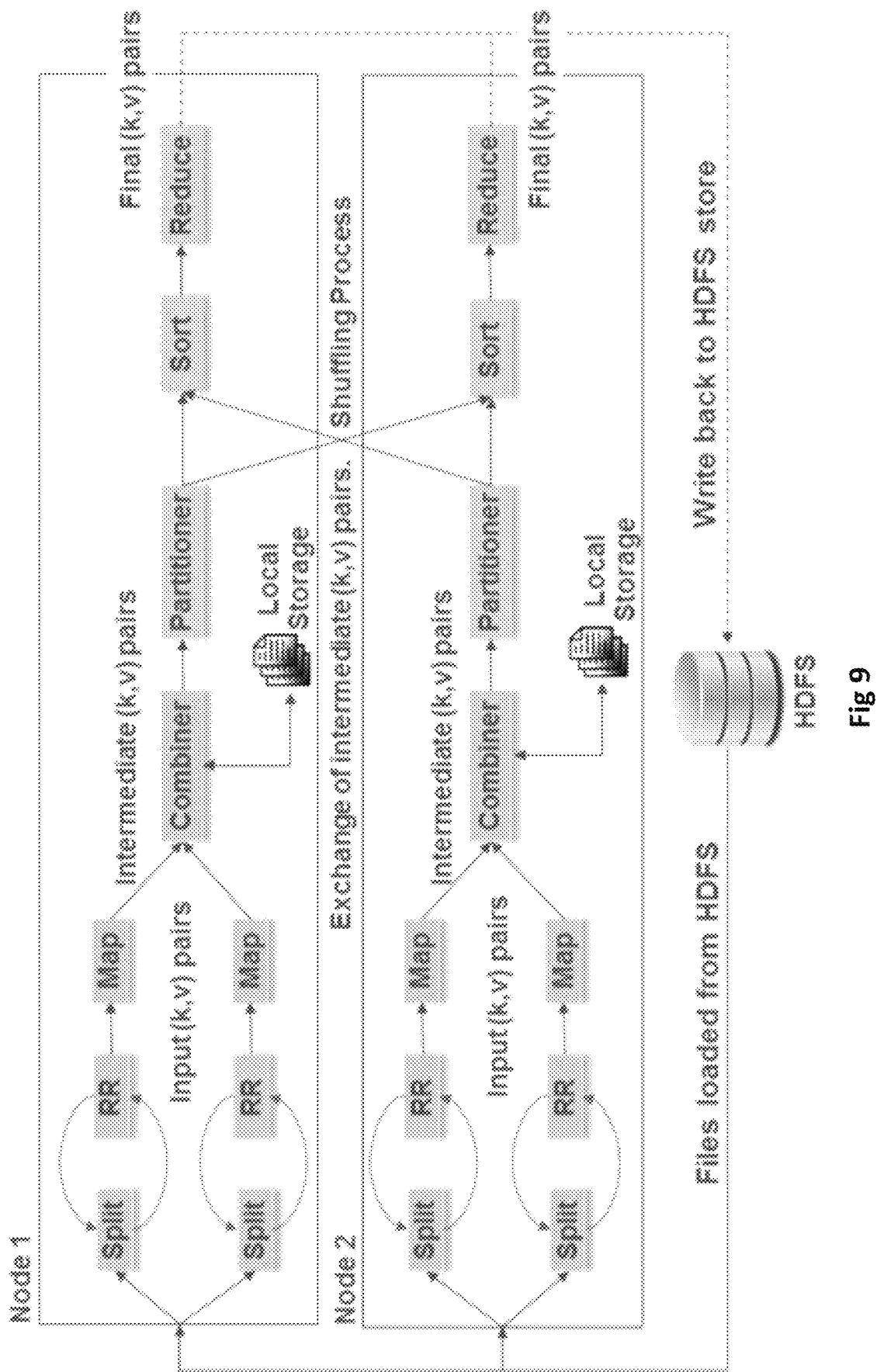
Figure 10B:
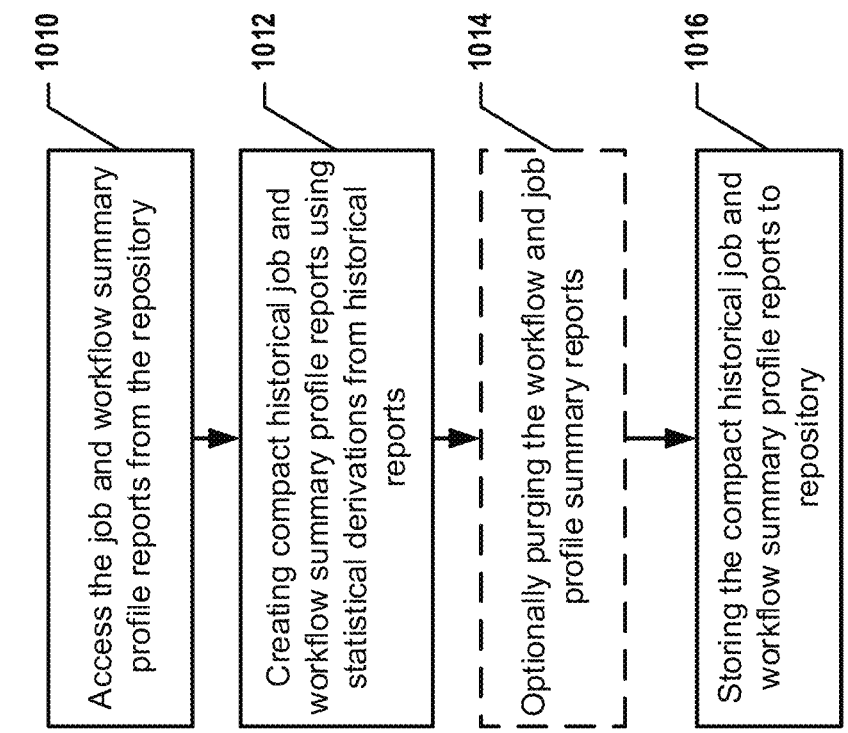
Figure 10A:
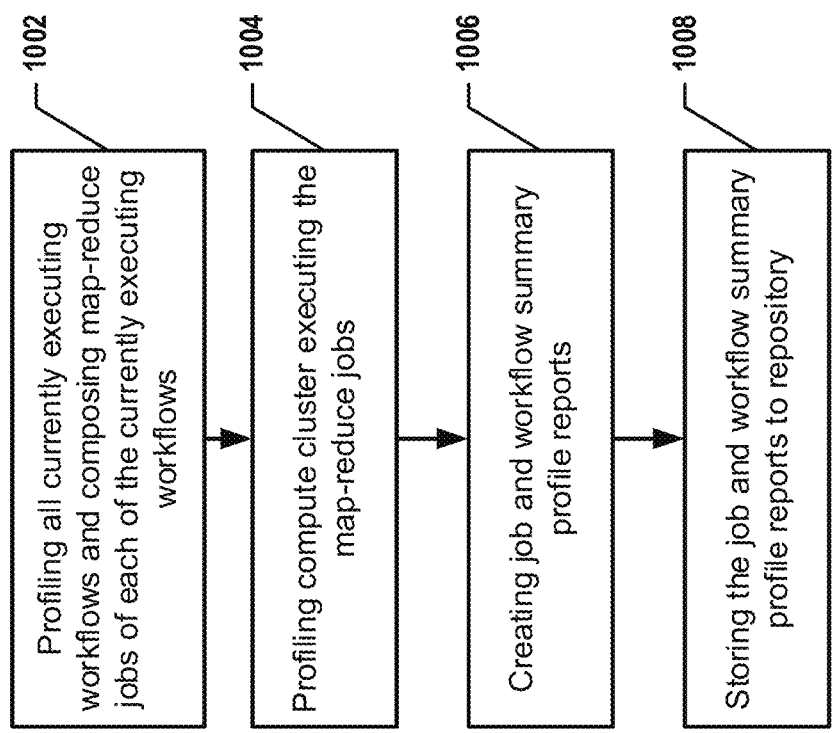
Figure 11A:
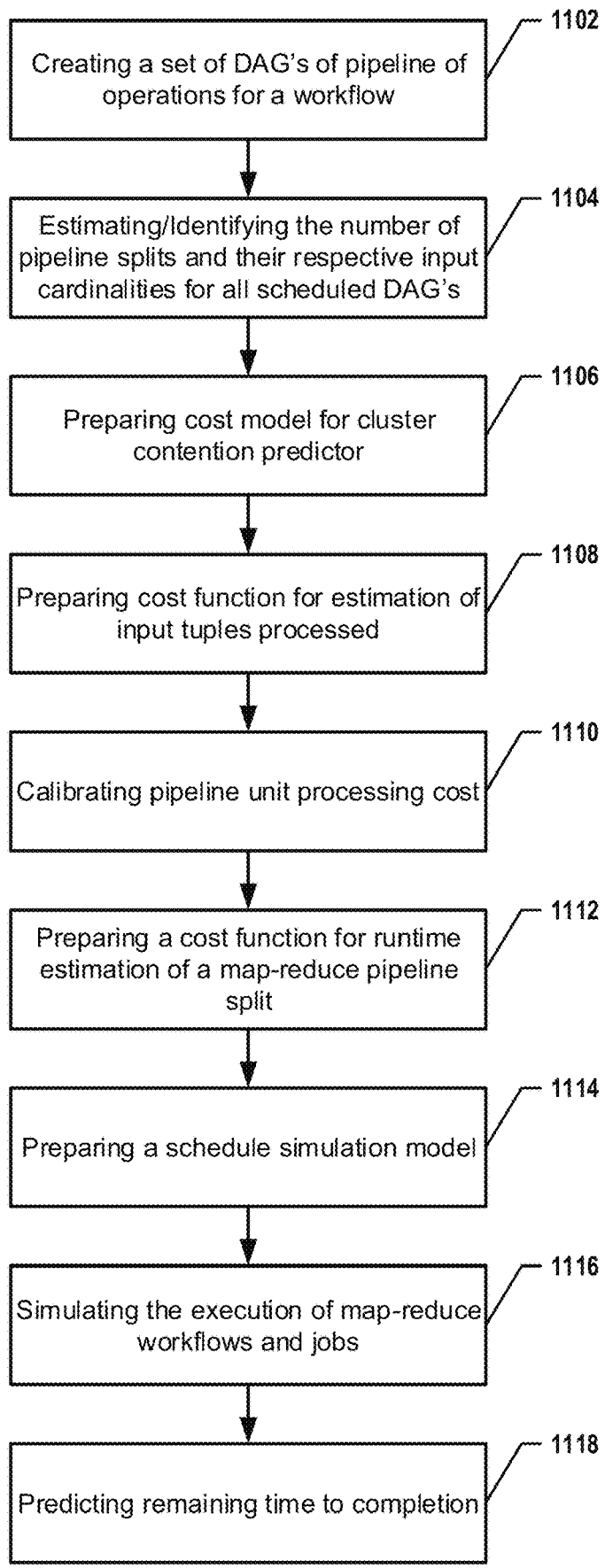
Figure 11B:
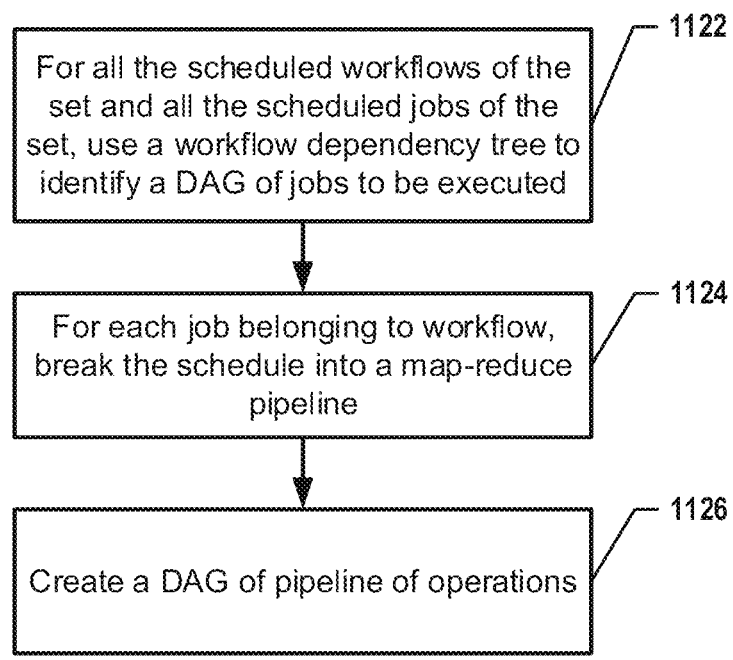
Figure 12A:
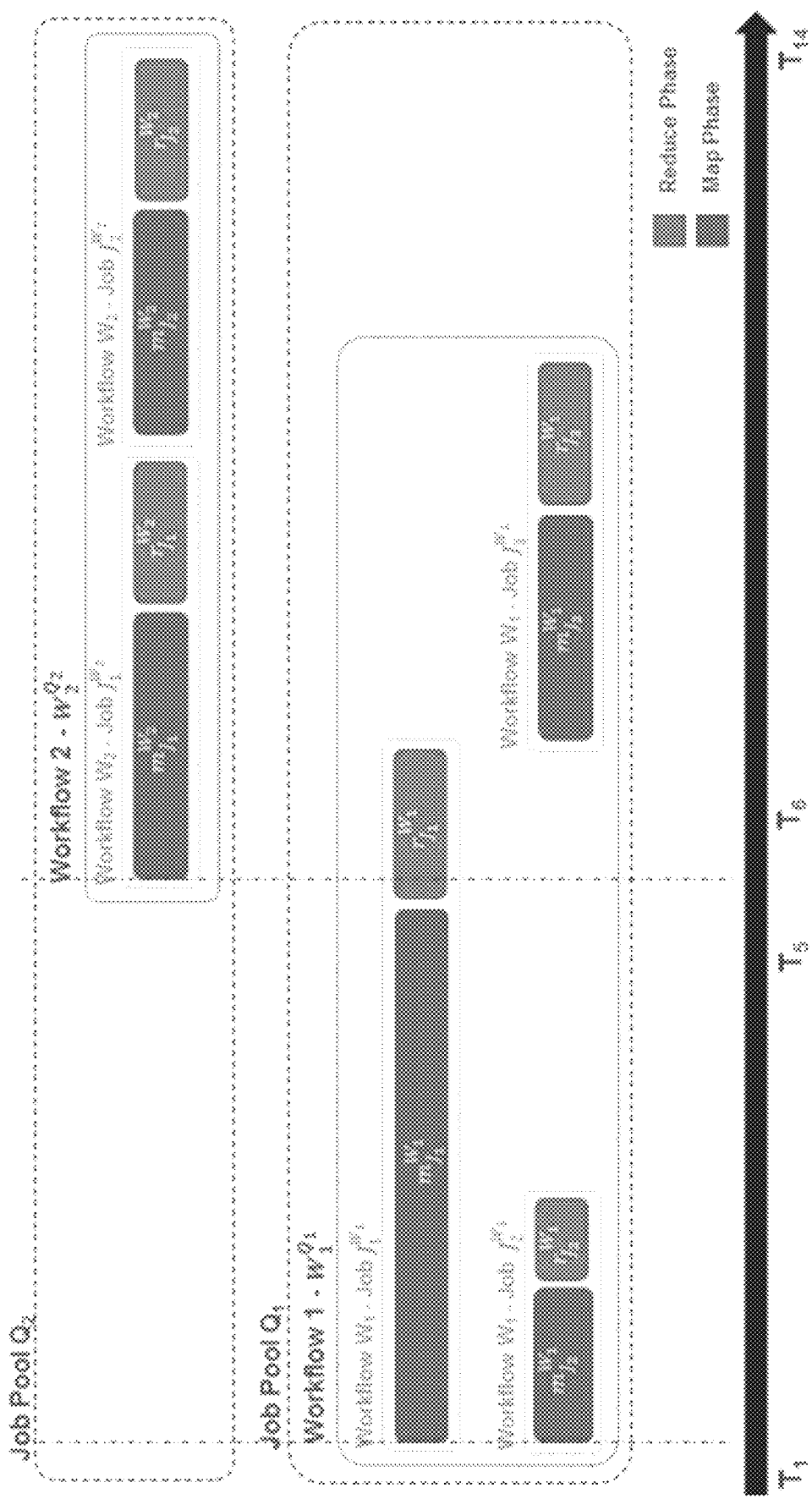
Figure 12B:
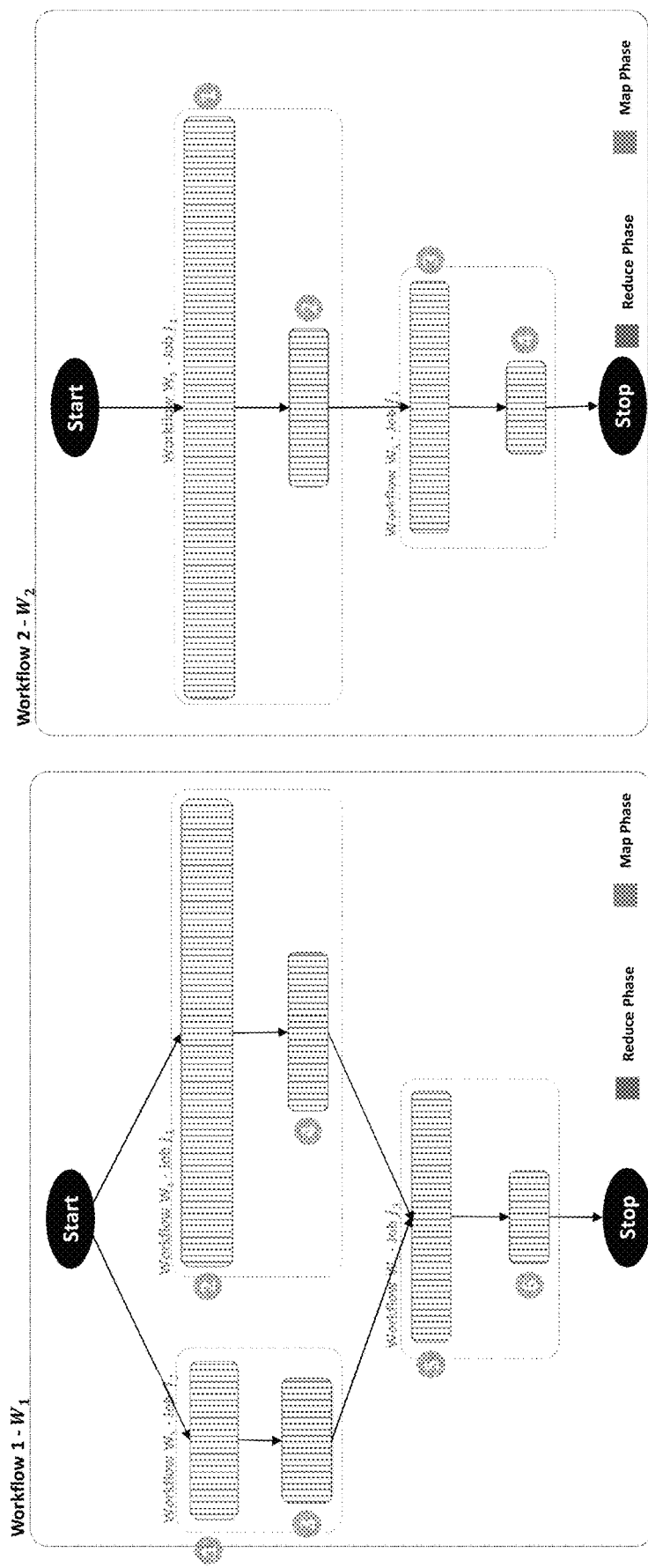
Figure 12C:
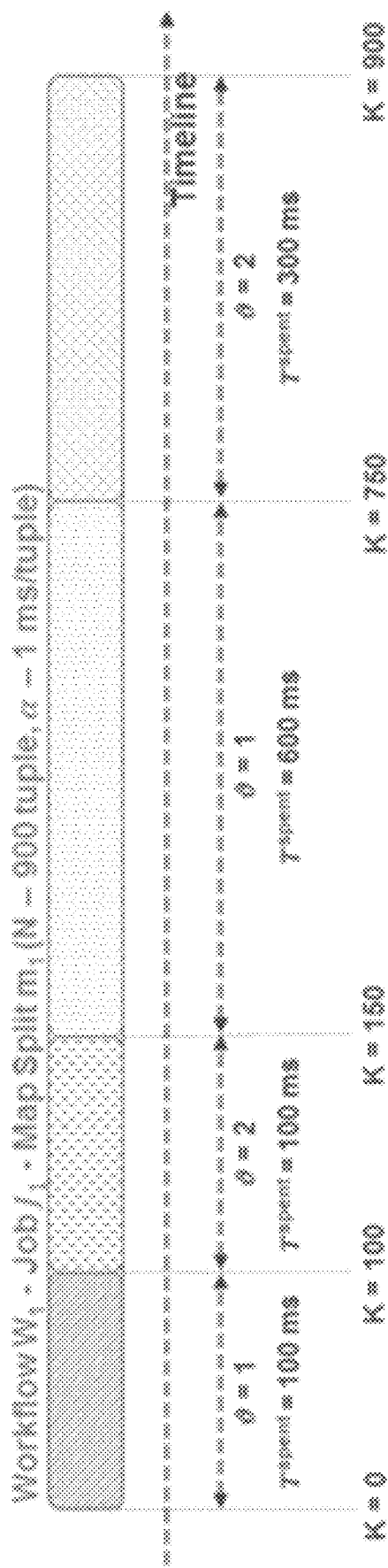
Figure 12D:
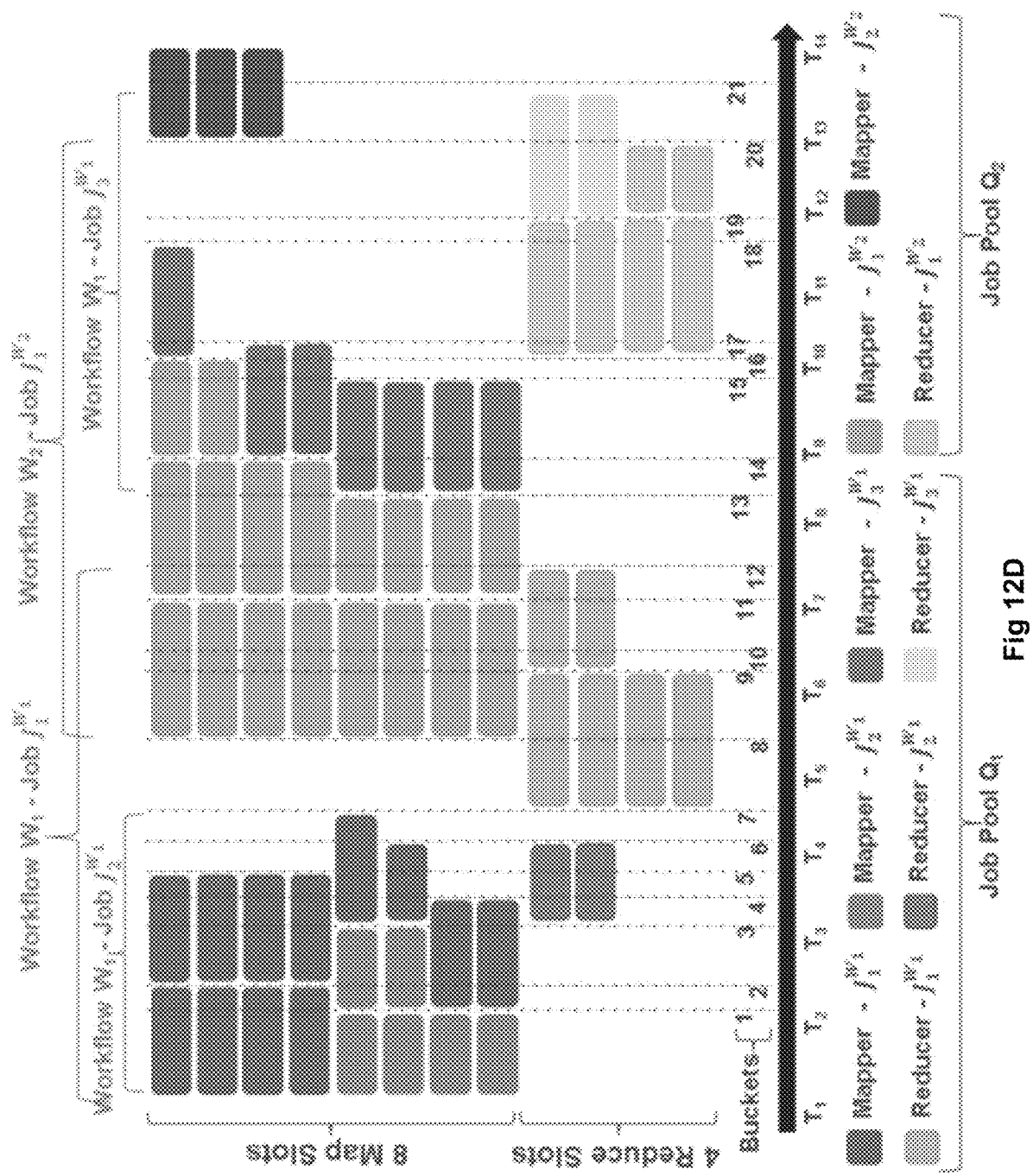
Figure 13:
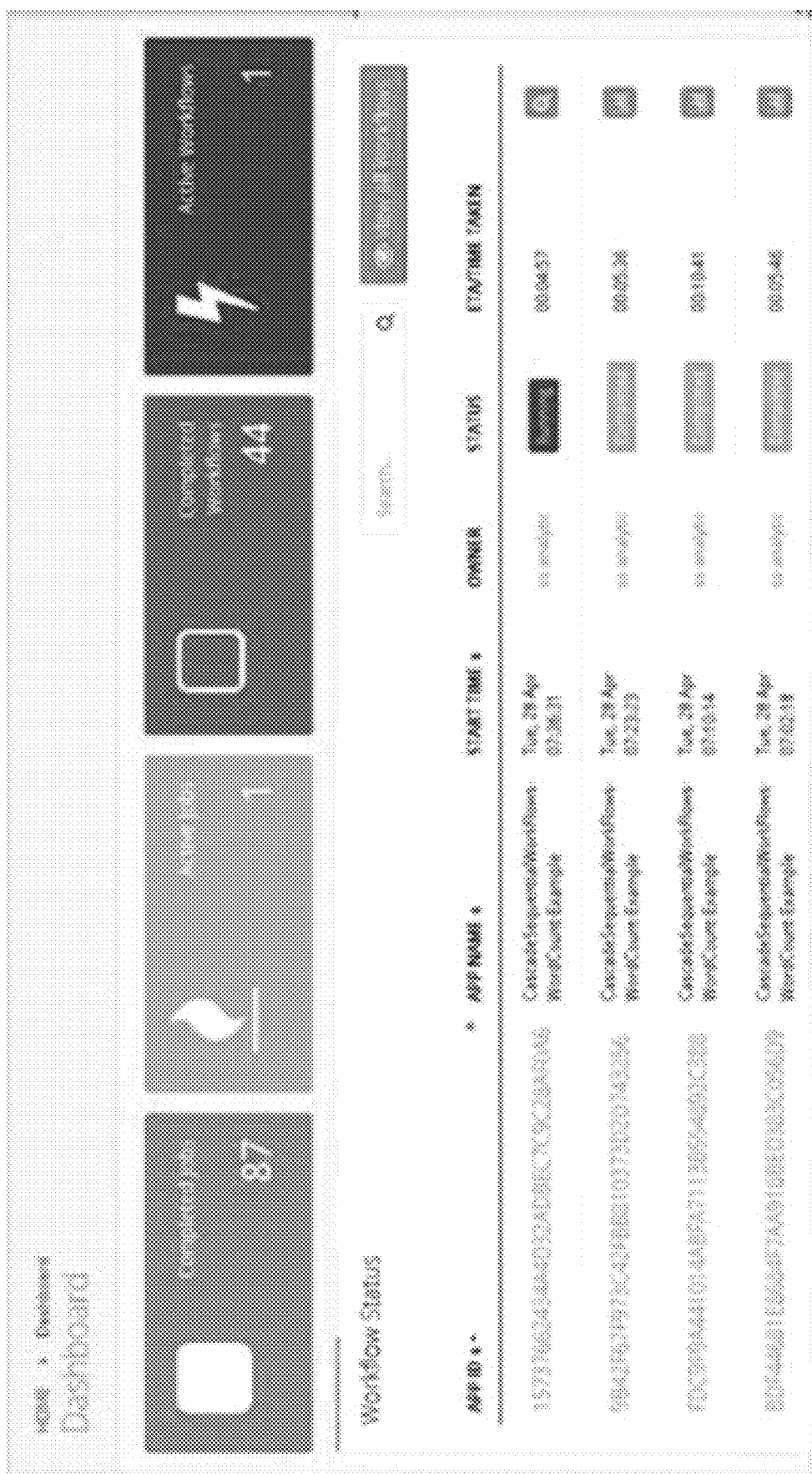
Figure 14:
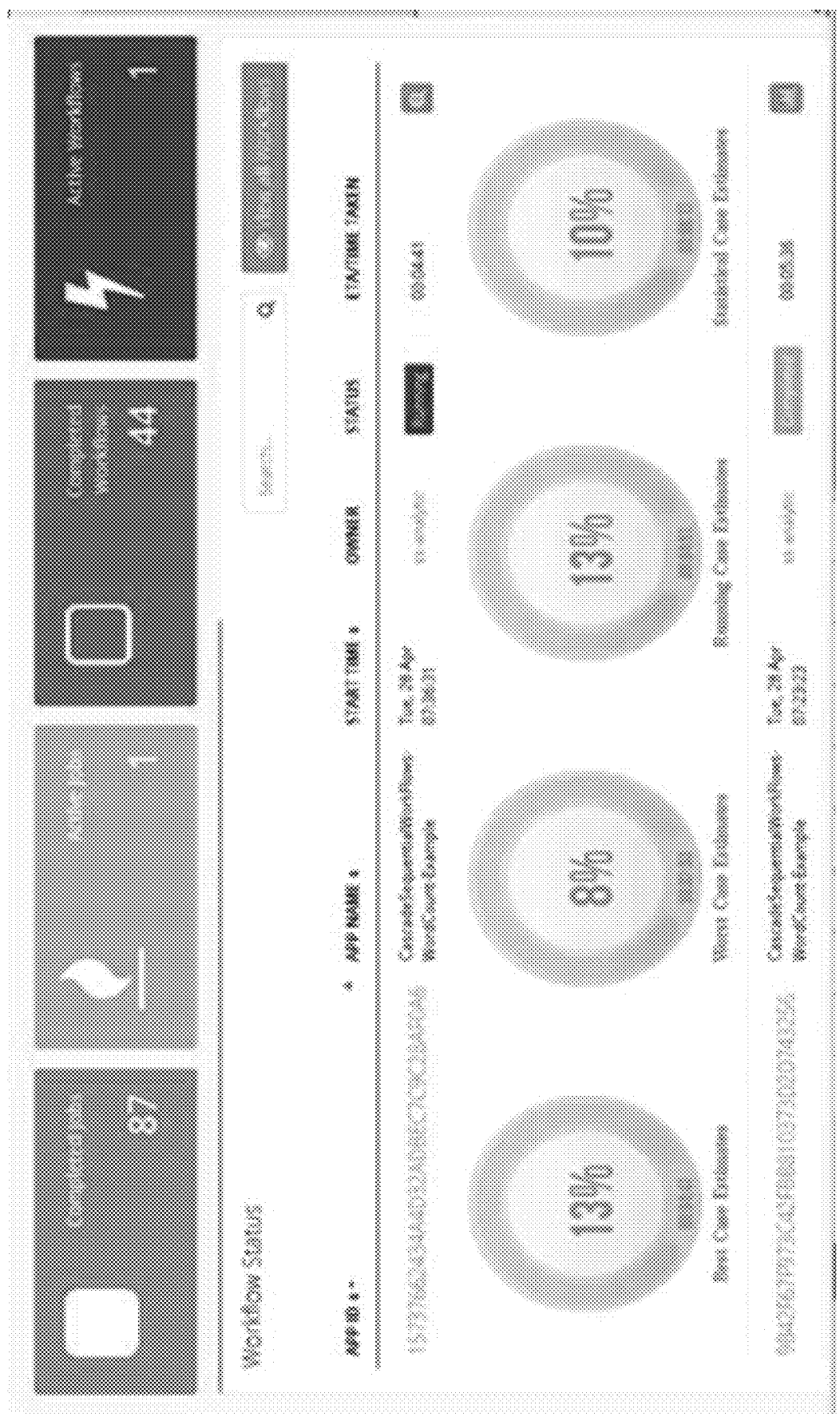
Figure 15:
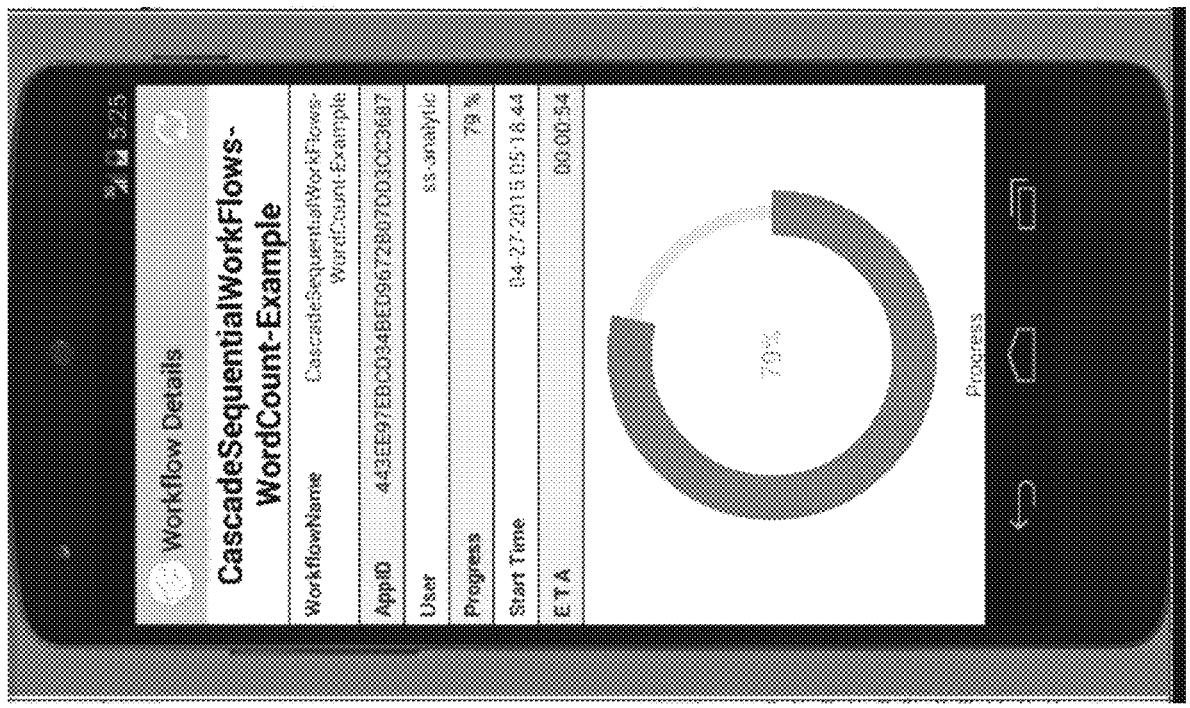
Figure 16:
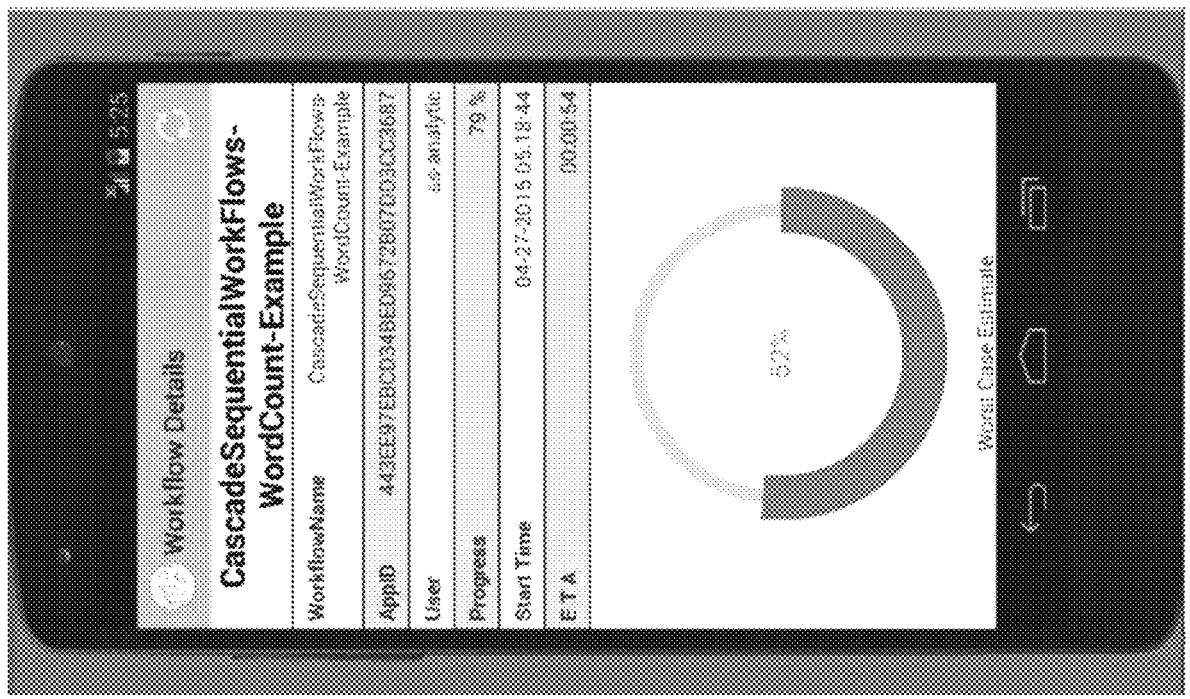
Figure 17:
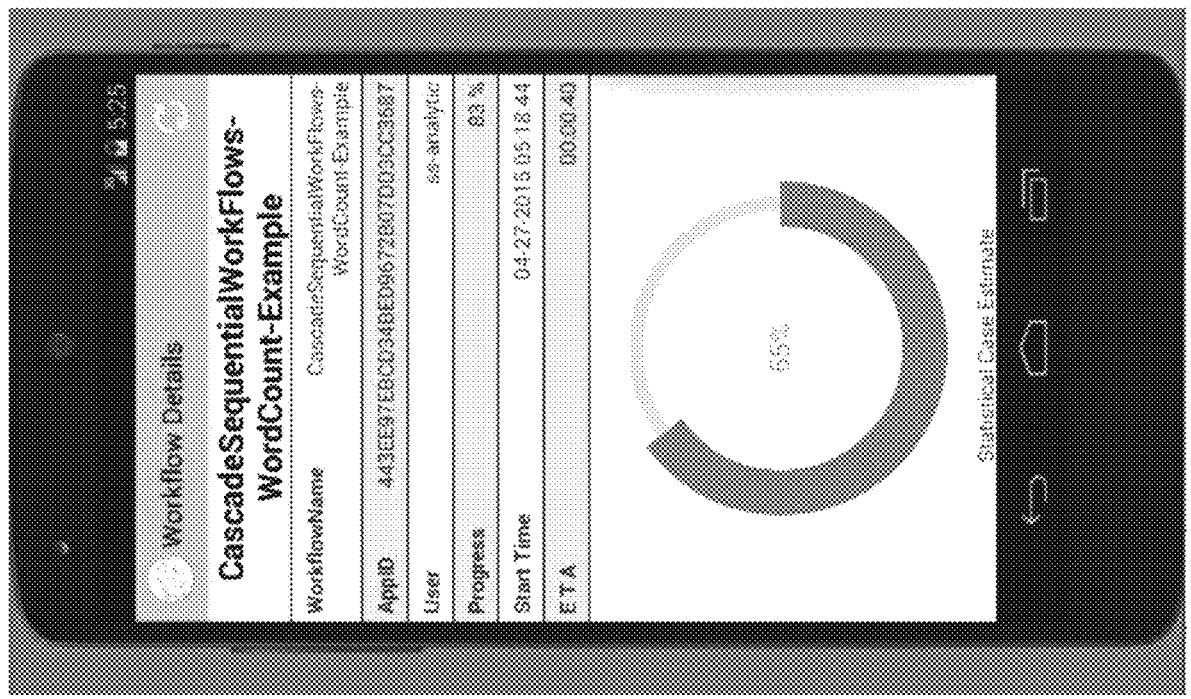
Figure 18:
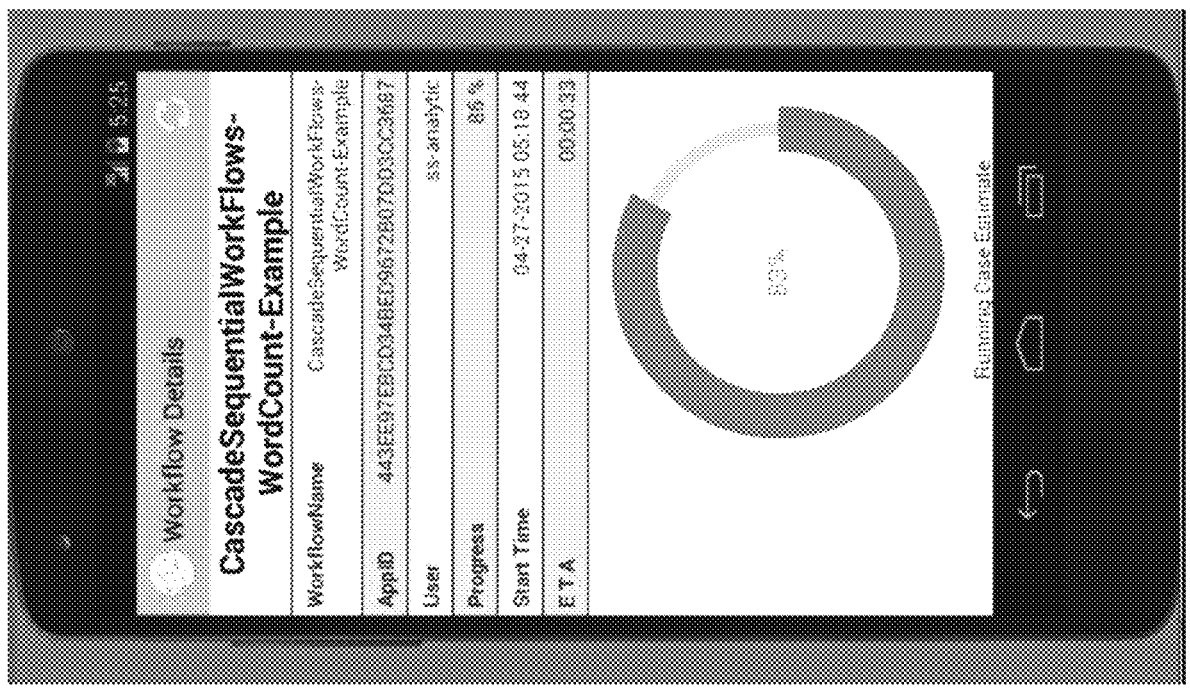

Having thus described certain example embodiments of the present disclosure in general terms, reference will now be made to the accompanying drawings, which are not necessarily drawn to scale, and wherein:

FIG. 1A illustrates an example of a shared multi-tenant distributed compute cluster 100 on which the present invention can be applied;

FIG. 1B illustrates an example computing entity that can be used to implement various computing entities in the present invention;

FIG. 2 illustrates a multi-tenant computing system 200 of distributed compute clusters comprising example embodiments of the present invention can be applied;

FIG. 3 illustrates a profiling agent 203 of the multi-tenant computing system, in accordance with an example embodiment of the present invention;

FIG. 4 illustrates a run-time prediction engine 207 of the multi-tenant computing system, in accordance with an example embodiment of the present invention;

FIG. 5 illustrates an expected execution schedule timeline model 401, in accordance with an example embodiment of the present invention;

FIG. 6 illustrates a high-level summary of receiving a MapReduce workflow and generating/outputting a run-time prediction for the MapReduce workflow performed by the multi-tenant computing system 200, in accordance with an example embodiment of the present invention;

FIG. 7A illustrates a pseudo example of a MapReduce workflow constituting a flow of operations to be applied, in accordance with an example embodiment of the present invention;

FIG. 7B illustrates an example of the compiled directed acyclic graph constituting jobs of FIG. 7A, in accordance with an example embodiment of the present invention;

FIG. 8 illustrates an example of a generic pipeline of a MapReduce job for a distributed compute cluster, in accordance with an example embodiment of the present invention;

FIG. 9 illustrates an example of MapReduce job pipeline for the Hadoop ecosystem in embodiments using Hadoop, in accordance with an example embodiment of the present invention;

FIG. 10A illustrates example operations performed by the profiling agent 203 to profile a set of workflows/jobs in a test debug run or in a periodic monitoring, in accordance with an example embodiment of the present invention;

FIG. 10B illustrates example operations performed by the profiling agent 203 to compact the historical workflows/jobs profile reports in a test debug run or in a periodic monitoring, in accordance with an example embodiment of the present invention;

FIG. 10C illustrates example operations performed by the profiling agent 203 to profile cluster contentions in a test debug run or in a periodic monitoring, in accordance with an example embodiment of the present invention;

FIG. 10D illustrates example operations performed by the profiling agent 203 to compact the historical cluster contention reports in a test debug run or in a periodic monitoring, in accordance with an example embodiment of the present invention;

FIGS. 11A and 11B illustrate example operations performed by the run-time prediction engine 207 to generate a prediction comprising a remaining time to completion for a workflow, in accordance with an example embodiment of the present invention;

FIG. 12A illustrates an example of set of scheduled workflows in a multi-tenant computing system, in accordance with an example embodiment of the present invention;

FIG. 12B illustrates an example of a directed acyclic graph (DAG) of pipeline splits for a MapReduce job in accordance with an example embodiment of the present invention;

FIG. 12C illustrates an example of a timeline during the course of execution of a pipeline split indicating estimation of input tuples processed, in accordance with an example embodiment of the present invention;

FIG. 12D illustrates an example of predicted execution schedule for multiple workflows, in accordance with an example embodiment of the present invention;

FIG. 13 illustrates an example web interface 208A showcasing run-time estimates for workflow's executing on the distributed compute cluster, in accordance with an example embodiment of the present invention;

FIG. 14 illustrates an example of various run-time offered by the system in hand, in accordance with an example embodiment of the present invention; and FIGS. 15 to 18 illustrates example mobiles interfaces 208B showcasing run-time estimates for a workflow with a defined name, in accordance with an example embodiment of the present invention.

DETAILED DESCRIPTION

Various embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

Example System Architecture

FIG. 1A illustrates an example of a shared multi-tenant distributed compute cluster 100 on which embodiments of the present invention can be applied. The multi-tenant distributed compute cluster 100 include one or more master nodes 101 and respective software components responsible for managing and allocating the cluster resources among the set of scheduled MapReduce applications. Example master nodes and respective software components include Hadoop Yet Another Resource Negotiator (YARN) Resource Manager, Hadoop MR1, Apache Mesos and/or the like.

As illustrated in FIG. 1A, a number of worker nodes 102A-D and respective software components responsible for performing the actual operation/function of the MapReduce application are represented. As will be recognized, the number of worker nodes can be represented as 102A-N, where N is an integer. The worker nodes 102A-D communicate with the master node 101 using the underlying network 103. In some embodiments, the worker nodes 102A-D are implemented with a Hadoop YARN Node Manager.

The multi-tenant distributed compute cluster 100 also may include a set of resource assignment policies and associated rules 104 of the distributed compute cluster for the intra-tenant and inter-tenant resource allocation. This example embodiment represents the scheduler configurations of the Hadoop YARN scheduler. The example configuration belongs to the YARN Fair Scheduler with the multi-tenant allocation policies.

The multi-tenant distributed compute cluster 100 also may include a set of application tools 105 configured to compile and submit the MapReduce application to the distributed compute cluster 100. The component could be part of the distributed compute cluster itself. In an example embodiment using Hadoop, application tools 105 may include an Apache PIG interpreter or a cascading client submitting a number of MapReduce jobs to Hadoop cluster.

FIG. 1B illustrates an example computing entity that can be used to implement various computing entities, nodes, and/or the like, such as a computing entity used to implement worker nodes 102A-D and/or master nodes 101. In general, the terms computing entity, computer, entity, device, system, and/or similar words used herein interchangeably may refer to, for example, one or more computers, computing entities, desktops, mobile phones, tablets, phablets, notebooks, laptops, distributed systems, servers or server networks, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on information/data, content, information, and/or similar terms used herein interchangeably.

As indicated, in one embodiment, the computing entity may also include one or more communications interfaces 116 for communicating with various computing entities, such as by communicating information/data, content, information, and/or similar terms used herein interchangeably that can be transmitted, received, operated on, processed, displayed, stored, and/or the like.

As shown in FIG. 1B, in one embodiment, the computing entity may include or be in communication with one or more processing elements 112 (also referred to as processors, processing circuitry, processing device, and/or similar terms used herein interchangeably) that communicate with other elements within the computing entity via a bus, for example. As will be understood, the processing element 112 may be embodied in a number of different ways. For example, the processing element 112 may be embodied as one or more complex programmable logic devices (CPLDs), microprocessors, multi-core processors, coprocessing entities, application-specific instruction-set processors (ASIPs), microcontrollers, and/or controllers. Further, the processing element 112 may be embodied as one or more other processing devices or circuitry. The term circuitry may refer to an entirely hardware embodiment or a combination of hardware and computer program products. Thus, the processing element 112 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 112 may be configured for a particular use or configured to execute instructions stored in volatile or non-volatile media or otherwise accessible to the processing element 112. As such, whether configured by hardware or computer program products, or by a combination thereof, the processing element 112 may be capable of performing steps or operations according to embodiments of the present invention when configured accordingly.

In one embodiment, the computing entity may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 114, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, information/data, applications, programs, program modules, scripts, source code, object code, byte code, compiled code, interpreted code, machine code, executable instructions, and/or the like. The terms database, database instance, database management system, and/or similar terms used herein interchangeably may refer to a structured collection of records or data that is stored in a computer-readable storage medium, such as via a relational database, hierarchical database, and/or network database.

In one embodiment, the computing entity may further include or be in communication with volatile media (also referred to as volatile storage, memory, memory storage, memory circuitry and/or similar terms used herein interchangeably). In one embodiment, the volatile storage or memory may also include one or more volatile storage or memory media 118, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, information/data, applications, programs, program modules, scripts, source code, object code, byte code, compiled code, interpreted code, machine code, executable instructions, and/or the like being executed by, for example, the processing element 112. Thus, the databases, database instances, database management systems, information/data, applications, programs, program modules, scripts, source code, object code, byte code, compiled code, interpreted code, machine code, executable instructions, and/or the like may be used to control certain aspects of the operation of the computing entity with the assistance of the processing element 112 and operating system.

As indicated, in one embodiment, the computing entity may also include one or more communications interfaces 116 for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Bluetooth protocols, Wibree, Zigbee, Home Radio Frequency (HomeRF), Simple Wireless Abstract Protocol (SWAP), wireless universal serial bus (USB) protocols, and/or any other wireless protocol.

Although not shown, the computing entity may include or be in communication with one or more input elements, such as a keyboard input, a mouse input, a touch screen/display input, motion input, movement input, audio input, pointing device input, joystick input, keypad input, and/or the like. The computing entity may also include or be in communication with one or more output elements (not shown), such as audio output, video output, screen/display output, motion output, movement output, and/or the like.

As will be appreciated, one or more of the computing entity's components may be located remotely from other computing entity components, such as in a distributed system. Furthermore, one or more of the components may be combined and additional components performing functions described herein may be included in the computing entity. Thus, the computing entity can be adapted to accommodate a variety of needs and circumstances. As will be recognized, these architectures and descriptions are provided for exemplary purposes only and are not limiting to the various embodiments.

FIG. 2 illustrates a multi-tenant computing system 200 along with an underlying multi-tenant distributed compute cluster 100 for example embodiments of the present invention can be applied. As illustrated in FIG. 2, the multi-tenant computing system 200 may include a network 103, application tools 105, and a multi-tenant distributed compute cluster 100. The multi-tenant computing system 200 may also include a profiling agent 203 configured to generate operational and performance profile reports of the MapReduce workflows and jobs and compact historical summary reports for MapReduce workflows and jobs executing on the given multi-tenant compute cluster. Example performance metrics included in the profiles include unit tuple processing cost, CPU time spent, input/output metrics, and/or the like. The profiling agent 203 may additionally be configured to generate cluster contention profile reports and compact historical cluster contention profile reports against various cluster settings. Example performance metrics in the cluster contention profile reports include map/reduce demand, disk input/output metrics, memory input/output metrics, and/or the like. Details regarding the profiling agent 203 are described later in conjunction with FIG. 3. Each MapReduce workflow may be identified by a defined name or other identifier metadata.

The multi-tenant computing system 200 may include a managed repository 205 configured to store and access the profiles and the profile summary reports. In certain embodiments, the repository provides a persistent or in-memory storage of the profiles and/or the profile summary reports. Although illustrated as a single repository instance, it should be understood that in certain embodiments, the managed repository 205 may encompass a plurality of physically and/or virtually distinct storage areas. The multi-tenant computing system 200 may also include a monitoring agent 206 to monitor (e.g., periodically) the distributed compute cluster and/or application tools to identify currently scheduled/executing MapReduce applications and their current state of execution. Details regarding generation of active contention reports generated by 206 are described later in conjunction with FIG. 10A. Alternatively, monitoring data could be provided via the repository 205 or a push-based mechanism from other components. For example, certain compute clusters may be configured to self-monitor and provide monitoring data to the monitoring agent 206. In the situations where the workflows in consideration are not yet submitted for execution, the monitoring agent 206 may be configured to provide estimated workflow information such as data source(s), execution plan, and/or the like.

The multi-tenant computing system 200 may also include a run-time prediction system 207 responsible for predicting the run-time of a given MapReduce workflow and/or job. In some embodiments using Hadoop, example MapReduce workflows may include a set of Pig scripts compiled into a directed acyclic graph (DAG) of MapReduce jobs on a Hadoop cluster.

208A-C represent various examples of run-time estimate interfaces (web interface 208A, mobile interface 208B, and service interface 208C), each of which may be operable and/or accessible via computing entities, providing run-time estimates offered by the prediction engine. Other types of run-time estimate interfaces may also be included. Example interfaces are illustrated in FIG. 13 to FIG. 18.

FIG. 3 schematically illustrates a profiling agent 203 of the multi-tenant computing system 200. To determine the completion time of a workflow, the profiling agent 203 is configured to use monitoring data regarding past executions to at least partially populate a set of workflow/job profiles and/or a set of workflow/job profile summary reports for each of those past executions. The profile summary reports may include various performance characteristics of the workflows such as a resource cost of processing a tuple of records for the entire map and of processing reduce functions of the included jobs. The profile summary reports may also include various functional characteristics of the workflows such as the input/output translation factors of the including jobs. Other performance metrics may also be included in the profile summary reports.

In a shared multi-tenant setting, the distributed compute cluster 100 may be configured to let a job scale up or scale down the parallelization width depending on the contention. To accurately estimate the completion time of the workflow in the given shared multi-tenant cluster, the profiling agent 203 may also generate profiles of the cluster contention trends. The profiled cluster contention reports include various metrics characterizing the load factor of various tenants on the cluster on various dimensions. Example metrics include the average peak demand requested by each tenant at a given time of the day on the cluster. Other performance metrics may also be included.

While generating the profile summary reports, the captured performance metrics may be normalized to a unit size so that the profile summary reports are scalable for predicting the run-time of a particular workflow. Scaling (up or down) helps to increase the accuracy of the run-time prediction in the presence of changes in run-time conditions like the cluster configuration, the input data sizes and/or the like. In some embodiments, various statistical analysis techniques are applied to create aggregated reports over the entire history or a limited history of profiling. Example statistical analysis techniques include calculating a mean, calculating confidence intervals, compiling best case and worst case data, and/or the like.

As illustrated in FIG. 3 and previously illustrated in FIG. 2, the profiling agent may include, or be in communication with, the distributed compute cluster 100, the application tools 105, and the repository 205. Element 309 of FIG. 3 illustrates a workflow/job profiler responsible for monitoring and capturing various performance and functional parameters related to executing workflows and jobs. Example performance and functional parameters include the CPU time spent, input tuples processed for the map, and reduce functions of all jobs of a workflow. Example performance and functional parameters may also include the input and output cardinalities of the map and reduce pipelines of the job. As will be recognized, various techniques may be employed by the profiler 309, such as periodic monitoring or using test debug runs. In some embodiments, the profiler 309 may be configured to use a pull-based mechanism to fetch data from the distributed compute cluster/application tools 105 or other external services integrated with the compute cluster 100. The profiler 309 may be configured to be notified data via a push-based mechanism from the distributed compute cluster/application tools 105 or other external services integrated with the distributed compute cluster 100 periodically. The cluster contention profiler 304 may also be configured to fetch data from the distributed compute cluster/application tools 105 or other external services integrated with the compute cluster 100 upon request. In some embodiments, the profiler 309 may also use a push-based mechanism by receiving data from other services.

The profiling agent 203 may include a cluster profiler 310 configured to profile the cluster performance characteristics for given physical and software settings. Example cluster performance characteristics include performance impact of processing a MapReduce pipeline due to differences in the configured logical resources and given available physical resources.

The profiling agent 203 may also include a workflow/job summary creator 311 configured to generate a set of profile summary reports based at least in part on the captured data in the workflow profile generated by the profiler 309 of a single execution of a workflow or job. The workflow/job summary creator may be configured to use various normalization techniques, so that various aspects of execution time variances such as cluster setting, contention, and data skews may be adjusted while predicting the run-time estimates. Example normalization techniques include deriving the time to process a unit input tuple of the map or reduce pipeline based at least in part on the CPU time spent and the input tuples processed.

The profiling agent 203 may also include a workflow/job compact summary creator 312 configured to create a compact historical summary profile comprising a single statistically aggregated summary report given all or a set of historical summary reports from the past execution runs. The workflow/job compact summary creator 312 may use various techniques to efficiently perform the time consuming operation of statistical analysis. One such example is to use a subset of past historical data available and use a scheduled periodic compaction process. The workflow/job compact summary creator 312 may create multiple versions of the profile summary reports indicating the worst case, best case, or statistically aggregated performance metrics.

The profiling agent 203 may also include an analytical model 313 configured to create statistically aggregated reports characterizing the performance and functional aspects of the past execution of workflows and jobs. In some embodiments, the analytical model 313 uses various statistical techniques to derive aggregated values most suitable for a possible run-time scenario. Example techniques used include deriving a worst case and best case tuple processing cost for the map and reduce functions of jobs of a workflow. Another example technique used may include deriving the average tuple processing cost observed over all the past executions.

Element 314 represents the derived job/workflow summary reports including the compact historical job/workflow summary reports of a plurality of jobs (e.g., all jobs) of a plurality of workflows (e.g., all workflows) executing on the cluster or as defined by the test debug run. The summary reports may be stored into a repository 205 for usage in a run-time prediction engine at a later point of time.

The profiling agent 203 may also include a cluster contention profiler 304 configured to monitor and capture the contention introduced by various tenants on to the cluster against a number of dimensions. In some embodiments, example data captured may include the current demand and occupancy of resources for all the tenants at any point of time. In some embodiments, the metrics may be captured with regard to various dimensions such as a time dimension.

In some embodiments, the cluster contention profiler 304 may also capture contextual contention data where tenant's demand and occupancies can be captured against the set of currently executing job's or workflows across the cluster. Various techniques can be employed by the profiler such as periodic monitoring or using test debug runs.

In some embodiments, the cluster contention profiler 304 may use a pull-based mechanism to fetch data from the distributed compute cluster 100 or external services integrated with the compute cluster 100. The cluster contention profiler 304 may be configured to fetch data from the distributed compute cluster 100 or external services integrated with the compute cluster 100 periodically. The cluster contention profiler 304 may also be configured to fetch data from the distributed compute cluster 100 or external services integrated with the compute cluster 100 upon request. In some embodiments, the cluster contention profiler 304 may use a push-based mechanism by receiving data from other services.

The profiling agent 203 may also include a contention summary creator 305 configured to create a cluster contention summary report based on a single instance of profiled contention data.

In some embodiments, contention summary creator 304 may be configured to derive the peak and minimum resource demands per tenant against the hour of the day and day of the week. In some embodiments, the contention summary creator 304 may be configured to calculate the minimum and maximum resource demands on the cluster from other intra/inter tenant workflows at the period of execution of a given workflow.

The profiling agent 203 may also include a cluster contention compact summary creator 306 responsible for creating a compact historical summary profile containing a single statistically aggregated contention summary report against a cluster setting based on all or a set of historical summary reports of cluster contention for a cluster setting.

The cluster contention compact summary creator 306 may use various techniques to efficiently perform the operations of statistical analysis that may be time-consuming. For example, the cluster contention compact summary creator 306 may use at least a subset of past historical data available and using scheduled periodic compaction process. Details regarding utilizing the past historical data are later described in conjunction with the flowcharts.

The cluster contention compact summary creator 306 may depend on analytical contention summary model 307 for creating statistically aggregated summary reports given all the previously captured contention reports. The analytical contention summary model 307 may be used to create statistically aggregated reports characterizing the cluster contention trends of various tenants of the cluster using past historical analysis and cluster settings. The analytical contention summary model 307 may use various statistical techniques to derive aggregated values most suitable for a possible run-time scenario. Example techniques utilized may include deriving the best case and worst case peak contention of various tenants at a given hour of day and a cluster setting.

Element 308 represents the derived cluster contention summary report including the compact historical cluster contention summary report generated by the cluster contention compact summary creator 306 by periodically monitoring or using test debug runs against the cluster settings. The summary reports are stored in a repository 205, so that the same can be used by a run-time prediction engine at a later point of time.

FIG. 4 illustrates a run-time prediction engine 207 of the multi-tenant computing system. The run-time prediction engine is configured to predict a run-time of one or more workflows in offline/online mode. The run-time prediction engine may be configured to predict the run-time for workflows, generate run-time estimates 411 for already scheduled workflows, and/or generate run-time estimates for executing workflows and for workflows that have not yet been submitted. To predict the run-time of the workflows, the system may utilize one of four different input data sets, for example. As will be recognized, some of the input data sets may conditionally be absent as described later.

Element 403 represents the reports of active contention in the cluster. Active contention reports 403 represent the currently executing/scheduled workflows on the cluster or optionally the workflows to be submitted. The report may include various functional, operational, and performance related metrics of the active workflows at hand. In some embodiments, example metrics include the executing status, resource demands, current resource occupancy, current speed of processing the job/workflow, input data sources, and/or the like of an executing workflow. Other example metrics include the execution plan, input data sources, and/or the like of an estimated scheduled workflow to plan the capacity of the cluster. Element 404 illustrates the current or targeted configuration of the underlying distributed compute cluster 100. Example configurations include the scheduling policies, tenant specific allocations, cluster capacity, user/tenant quota, and/or the like.

Element 314 represents the workflow profiling summary reports and 308 represents the cluster contention summary reports against the various cluster settings previously derived as described in conjunction with FIG. 3 and described in more detail in exemplary system operation sections. To predict the run-time of the workflows, the system relies on following components as described below:

The run-time prediction engine 207 may also include a monitoring agent 206 configured to provide reports on the currently scheduled and executing workflows on the cluster. The monitoring agent 206 is also configured to feed in the current configuration of a compute cluster. In the scenarios where the input workflow(s) are not yet submitted, monitoring agent may provide the estimated reports of the planned workflows. Example reports may include the execution plan, data sources, and/or the like.

The run-time prediction engine 207 may also include or be connected with the central repository 205 configured to provide mechanism for reading and storing profiled reports of the past historical runs.

To predict the execution time of the workflow, the run-time prediction engine 207 may be configured to derive and utilize an expected execution schedule timeline 409 of all the active contentions along with a predicted timeline of specific events of the current and expected future schedule generated by an expected execution schedule timeline creator 408. Example events include a timeline indicating the beginning and completion of each workflow and job on the cluster. Another example event may include a predicted event indicating an increase in contention at a point of time in the future. Element 408 illustrates the component responsible for creating the expected execution schedule timeline using the current and predicted future contention along with various metrics. In some cases, if the active contention is not available and the prediction is required to be done for the planned workflows, 409 may represent the expected execution schedule timeline using the planned workflow contention and expected future contention.

The expected execution schedule timeline creator 408 may utilize an expected execution schedule timeline model 401 in deriving the expected execution schedule. One example of execution schedule timeline model 401 is a computation model using deterministic cost functions and methods of simulation to derive an expected execution schedule. In other extensions of this embodiment, the execution schedule timeline model 401 may use machine learning models using various performance metrics and profiled analysis reports of past execution runs.

FIG. 5 illustrates an expected execution schedule timeline model 401. The expected execution schedule timeline model 401 may include a DAG generator 508 configured to generate a set of DAGs 509 for each MapReduce application/workflow in the active contention composed of all its Map-Reduce jobs. In some embodiments, utilizing Hadoop, the DAG generator 508 may be configured to decompose a scheduled PIG script into an ensemble of MapReduce jobs as a DAG executing on a Hadoop cluster. The DAG generator 508 may also be configured to decompose a cascading workflow in order to evaluate its performance on a new cluster setting. In an example embodiment using Hadoop, the DAG generator 508 is a DAG generator for PIG scripts, complex Hive queries, Oozie workflow on a Hadoop platform, and/or the like.

The expected execution schedule timeline model 401 also include a pipeline estimator 510 configured to estimate the DAG of pipelines of operations and generate a set of pipeline estimates 511. A pipeline represents a group of interconnected operators that execute simultaneously on a given MapReduce computing cluster. Each node of such a DAG represents a data pipeline operation, where each pipeline operation can be parallelized by a number of pipeline splits, depending on the run-time factors like contention, cluster settings, and/or the like.

The expected execution schedule timeline model 401 also may include a cardinality estimator 512 configured to generate a set of cardinality estimates 513 for each pipeline and its corresponding pipeline split. The cardinality estimator 512 may generate cardinality estimates for currently executing and scheduled pipeline splits and for upcoming future pipeline splits.

The expected execution schedule timeline model 401 may also include a cluster contention predictor 506 configured to generate predicted cluster contention 507 for all the tenants for a given cluster setting at any given time in the future. The cluster contention predictor 506 may generate predicted cluster contention 507 using various statistical and/or predictive machine learning models using the historic cluster contention summary report 308, which may include various clusters setting represented. Predicted cluster contention 507 may be derived against various dimensions like time, events, co-occurring workflows and other tenant contention behaviors in various cluster settings.

The expected execution schedule timeline model 401 may also include a calibrator 514 configured to calibrate the profiled unit processing cost from the historical runs according to the current speed of processing the pipeline using the active contention report 403 and workflow/job summary report 314. The calibrator 514 uses various statistical techniques to derive a single aggregated value of calibrated cost 515 per execution case scenario using the historically computed cost and data indicative of the current contention. In the scenario of estimating the run-time of a workflow/job that has not yet started, the calibration may be omitted and past historic summary data may be used for estimation. An example of an execution case scenario is to derive the worst and best unit processing cost in order to factor in the data skew variations. Another example technique may include calculating median/mean unit processing costs using the past and current contention reports.

The expected execution schedule timeline model 401 may also include a processed cardinality estimator 517 configured to estimate the input tuples processed of a given pipeline split. The processed cardinality estimator may be utilized by a pipeline split run-time cost estimator 516 to predict the run-time to completion of a scheduled or an executing pipeline split. The schedule simulation and prediction model 501 may be configured to utilize the pipeline split run-time cost estimator 516 to build an expected execution schedule along with a timeline of events.

Example System Operations

Having described the circuitry comprising some embodiments of the present invention, it should be understood that the run-time prediction engine 207 may predict the estimated time to completion of a MapReduce workflow, for example, based at least in part on past performance characteristics of active contention using the historic profile summary reports and the estimated future cluster contention trends from the cluster contention summary reports. For the purpose of improved accuracy, the run-time prediction engine 207 may also use the functional and performance data of the current executing workflows and the underlying distributed compute cluster settings to closely predict the expected execution schedule.

A MapReduce workflow is defined as an ensemble of MapReduce jobs organized as a DAG. In some embodiments using Hadoop, an example of a MapReduce workflow is the compiled flow of MapReduce jobs to be executed on Hadoop cluster. FIG. 7A illustrates a pseudo example of a MapReduce workflow constituting a flow of operations to be applied. FIG. 7B illustrates an example of the compiled DAG of the constituting jobs of FIG. 7A.

FIG. 6 illustrates a high-level summary of receiving a MapReduce workflow and generating/outputting a run-time prediction for the MapReduce workflow performed by the multi-tenant computing system 200. At step/operation 602, the multi-tenant computing system 200 is configured to receive a MapReduce workflow with a defined name. The MapReduce workflow comprises one or more MapReduce jobs. At step/operation 604, the multi-tenant computing system 200 is configured to access the workflow profile summary report of active contention, wherein active contention represents the currently executing workflows in the multi-tenant distributed compute cluster. Generation of active contention workflow profile summary report is described in more detail in conjunction with FIG. 10A. At step/operation 606, the multi-tenant computing system 200 is configured to access a compact historical workflow profile summary report of the MapReduce workflow. Generation of compact historical workflow profile summary report from the historical profile reports is described in more detail in conjunction with FIGS. 10A and 10B.

At step/operation 608, the multi-tenant computing system 200 is configured to access one or more compact historical cluster contention summary reports with regard to various cluster settings of the multi-tenant distributed computing system 100. Details regarding generating the compact historical cluster contention summary reports from the historical cluster contention summary reports are later described in conjunction with FIGS. 10C and 10D. At step/operation 610, the multi-tenant computing system 200 is configured to access the configuration of the targeted multi-tenant distributed compute cluster 100 and application tools 105 upon which the example embodiment of the present invention is applied. At step/operation 612, the multi-tenant computing system 200 is configured to generate a run-time prediction for the MapReduce workflow using the active contention workflow profile summary report, compact historical workflow profile summary report, targeted computing cluster configuration and the one or more compact historical cluster contention summary reports. Details regarding generating the run-time prediction are later described in conjunction with FIGS. 11A and 11B. At step/operation 614, the multi-tenant computing system 200 is configured to output the run-time prediction to run-time prediction interfaces 208A-208C configured to display the run-time prediction. Example run-time prediction interfaces are provided in FIGS. 13 to 18.

A MapReduce job comprises a map phase followed by a reduce phase. Each phase of the job comprises a pipeline of operations to apply a given user defined function on the input data. FIG. 8 illustrates an example of a pipeline of a MapReduce job for a distributed compute cluster. FIG. 9 illustrates an example of MapReduce job pipeline for the Hadoop ecosystem in embodiments using Hadoop. Furthermore, a distributed compute cluster 100 parallelizes the execution of a single job by splitting a single pipeline into a number of individual tasks/splits, each of which can be executed in parallel. Hence, each pipeline of each MapReduce job may further comprise a number of individual units/tasks called pipeline splits.

The run-time prediction engine 207 estimates the run-time of the workflow by estimating the run-time of all the workflows scheduled on the cluster. The run-time of a workflow can be predicted by estimating the run-time of all the constituting MapReduce jobs, while the run-time of the MapReduce job can be estimated by estimating the run-time of its entire underlying pipeline's. The run-time of the underlying pipelines depend upon the parallelization achieved at run-time, which further depends upon the contention, cluster configuration, scheduling policies, and/or the like of the cluster.

Profiling agent 203 is configured to profile a distributed compute cluster 100, the cluster contention trends, and the workflows executing on the cluster. At least one test debug run or past performance profiling report is utilized by the profiling agent 203 for the run-time prediction. The profiling can be done using test debug runs or periodically monitoring the cluster.

Profiling Workflows/Jobs

Turning now to FIG. 10A, FIG. 10A illustrates example operations performed by the profiling agent 203 to profile a set of workflows/jobs in a test debug run or in a periodic monitoring. FIG. 10A also additionally illustrates example operations performed by the monitoring agent 206 to generate profile reports for active workflows/jobs executing on one or more multi-tenant distributed compute clusters 100. At step/operation 1002, the profiling agent 203 and/or the monitoring agent 206 is configured to profile all the MapReduce jobs $J_i^{W_N}$ including all of its pipelines p belonging to workflow $W_N$ currently executing in the underlying distributed compute cluster 100 or as identified by the test debug runs using the workflow/job profiler 309 responsible for monitoring and capturing various performance and functional metrics of the executing workflows and job. Example data captured may include the CPU time spent and input tuples processed for the map and reduce pipelines of all the jobs of a workflow. Another example data captured may include the input and output cardinalities of all the pipelines of the job. Additionally, the profiling agent 203 and/or the monitoring agent 206 is configured to profile the MapReduce workflows $W_N$ using the workflow/job profiler 309. Example data captured may include the input/output metrics of the workflow jobs, the convergence cost function of the composing jobs, directed acyclic graph of the workflow and/or the like.

At step/operation 1004, the profiling agent 203 and/or the monitoring agent 206 is configured to profile the underlying distributed compute cluster 100 given the current software and hardware configuration using the cluster profiler 310. In some embodiments, the cluster profiler 310 may use a number of test debug runs on every change of physical or logical setting of the compute cluster to profile the cluster. In some embodiments using Hadoop, the cluster profile may capture the estimation of the cost function of the slowdown factor for the given Hadoop setting and the underlying physical hardware.

For an example embodiment using Hadoop, Hadoop resource managers like YARN and JobTracker use the concepts of containers and slots respectively to spawn multiple MapReduce tasks on a given physical hardware. The cluster profile may be configured to first profile the performance impact of configured resource allocation settings on the given physical setup involves estimating a cost function $\vartheta_i$. Given a processor $P_i$ of the compute cluster, $\vartheta_i$ represents the slowdown factor introduced due to multiplexing of multiple virtual cores to a single physical core. Slowdown factor $\vartheta_i$ can be calculated as (vcores$_i^{occupied}$/cores$_i$) μ, where vcores$_i^{occupied}$ represents the occupied virtual cores of the processor $P_i$ during the course of execution of the given pipeline p. And cores$_i$ represents the number of physical cores of the processor $P_i$. Further μ represents the rate at which the slowdown factor increases with the increase in the number of virtual cores per a physical core. For most practical environments, 0 ≤μ≤1 holds. For most practical environments, $\vartheta_i$ tends to remain equal to 1, if vcores$_i^{occupied}$≤cores$_i$ for a processor $P_i$. For example, in case of MR1 Job Tracker, $\vartheta_i$ can be identified as slot$_i^{occupied}$/cores$_i$, if slots$_i^{occupied}$≥cores$_i$ for a given processor $P_i$, otherwise 1.

At step/operation 1006, the profiling agent 203 and/or the monitoring agent 206 is configured to create job/workflow summary profile report by deriving performance and functional metrics from the captured profiled data by using the workflow/summary creator 311.

An example of a profiled summary metric is the estimation of pipeline unit processing cost $$(\alpha_p^{J_i^{W_N}})$$

for all the pipelines of job $J_i^{W_N}$ belonging to workflow $W_N$. The pipeline's unit processing cost $(\alpha_p^{J_i})$ for a pipeline p and a job $J_i$ is defined as the amount of time required for a processor core $C_i$ to process an input tuple in a given pipeline p. The unit processing cost $\alpha_p^{J_i}$ can be represented as msec/tuple.

The average tuple processing cost $(\alpha_p^{J_i})$ can be calculated as $(T_{p\_split}/N_{p\_split})/\vartheta_i$, where $T_{p\_split}$ represents the amount of time required to complete a pipeline split. $N_{p\_split}$ represents the input cardinality of the pipeline split. $\vartheta_i$ is the cost function representing the slowdown factor introduced due to multiplexing of multiple virtual cores to a single physical core. $\vartheta_i$ is provided by 310.

In order to decrease the impact of data skew within a pipeline, a statistically aggregated value may be prepared using all the splits of the pipeline executing on the same processor type $P_i$. For example, a statistically aggregated value that represent the best case, worst case and median costs associated with the splits of the pipeline executing on the same processor type $P_i$ may be prepared.

Another example of a profiled summary metric is the estimation of the filter ratio $$f_p^{J_i^{W_N}}$$

for a pipeline p of a job $J_i^{W_N}$. A pipeline filter ratio $$f_p^{J_i^{W_N}}$$

is defined as the fraction of input data that the pipeline p process produces as output. For most practical purposes, 0≤f≤1 holds. The average pipeline filter ratio $$f_p^{J_i^{W_N}}$$

can be calculated as $N_{p\_split}/O_{p\_split}$, where $N_{p\_split}$ represents the input cardinality of the pipeline split. Also, $O_{p\_split}$ represents the output cardinality of the pipeline split. In order to decrease the impact of data skew within a pipeline, a statistically aggregated value may be prepared using all the splits of the pipeline. For example, a statistically aggregated value that represents the best case, worst case, and median of the pipeline filter ratios may be prepared.

Another example of a profiled summary metric is the estimation of the transforming ratio $$M_{J_i^{W_N}}$$

for a job $J_i^{W_N}$. The transformation ratio $$M_{J_i^{W_N}}$$

is defined as the fraction of input that the job $J_i^{W_N}$ produces as output. The average transforming ratio $$M_{J_i^{W_N}}$$

can be calculated as $$N_{J_i^{W_N}} / O_{J_i^{W_N}},$$

where, $$N_{J_i^{W_N}}$$

represents the input cardinality of the job $J_i^{W_N}$, and $$O_{J_i^{W_N}}$$

represents the output cardinality of the job $J_i^{W_N}$.

At step/operation 1008, the profiling agent 203 and/or the monitoring agent 206 is configured to store the job/workflow summary profile reports 314 into the repository 205. The operations described in conjunction with FIG. 10A may be performed for multiple iterations.

Turning now to FIG. 10B, FIG. 10B illustrates example operations performed by the profiling agent 203 to compact the set of workflows/jobs profile reports in a test debug run or in a periodic monitoring.

At step/operation 1010, the profiling agent 203 is configured to access the job/workflow summary profile reports stored in the step 1008 such that all the reports of the same workflow/job can be collected together.

At step/operation 1012, the profiling agent 203 is configured to compact the job/workflow summary profile reports by deriving a statistically aggregated value for each derived metric using all or a set of past historically captured profiled reports by using workflow/job summary creator 312 and analytical workflow/job summary model 313. An example analytical workflow/job summary model 313 may include an estimation of a number of pipeline unit processing costs $\alpha_p^{J_i}$ targeted to a specific possible execution case scenario $EC_j$. Some of the examples include $\alpha_p^{J_i,EC_{worst}}$, $\alpha_p^{J_i,EC_{best}}$ and $\alpha_p^{J_i,EC_{statistical}}$ representing the worst case, best case, and a statistically computed unit processing cost.

At optional step/operation 1014, the profiling agent 203 may additionally be configured to purge the old workflow/job summary profile reports which have already been compacted.

At step/operation 1016, the profiling agent 203 is configured to store the compact historical job/workflow summary profile 314 into the repository 205. The compact historical job/workflow summary profile 314 may be used by the run-time prediction engine 207 later. The operations described in conjunction with FIG. 10B may be performed for multiple iterations.

Profiling Cluster Contentions

Turning now to FIG. 10C, FIG. 10C illustrates example operations performed by the profiling agent 203 to profile cluster contentions. At step/operation 1018, the profiling agent 203 is configured to profile the cluster load for all the tenants of the underlying distributed compute cluster by utilizing the cluster contention profiler 304. At least one of the profiled reports must exist for the cluster contention to provide the statistically aggregated run-time prediction. Profiling can be done by periodically monitoring the cluster or during the course of execution of few test debug runs. The cluster contention profiler 304 may be configured to monitor and profile all the executing workflows and jobs across the tenants. Example monitoring data captured include the current demand and occupancy of resources for all the tenants at a given point in time. The data can be captured against various dimensions. One example is to capture the contention with respect to time dimension. Another example dimension may include contextual contention, where tenant's demand and occupancies can be captured against the set of currently executing job's or workflows across the cluster.

At step/operation 1020, the profiling agent 203 is configured to create summary profile report for the cluster contention by deriving various cumulative contention variables from the captured profiled data for a given profiling run by utilizing summary creator 305. Example data derived while creating the summary profile report include the peak or average resource demands per tenant pool against each hour of the day and day of the week. Some of the examples of the resource demand variables include $m_{Q_i}^{demand}$, $r_{Q_j}^{demand}$, $$Mem_{Task_{Q_j}^{m_i}}^{demand}, Mem_{Task_{Q_j}^{r_i}}^{demand}, Disk_{Task_{Q_j}^{m_i}}^{demand},$$

$$Disk_{Task_{Q_j}^{r_i}}^{demand}, m_{Q_j}^{demand}, r_{Q_j}^{demand}$$

represents the map/reduce split execution demand from a given tenant $Q_j$;

$$Mem_{Task_{Q_j}^{m_i}}^{demand}, Mem_{Task_{Q_j}^{r_i}}^{demand}$$

represents the memory demand from a given map/reduce task from a tenant $Q_j$;

$$Disk_{Task_{Q_j}^{m_i}}^{demand}, Disk_{Task_{Q_j}^{r_i}}^{demand}$$

represents the disk demand from a given map/reduce task from a tenant $Q_j$.

At step/operation 1022, the profiling agent 203 is configured to store the cluster contention summary profile report 308 in the repository 205. The operations described in conjunction with FIG. 10C may be performed for multiple iterations.

Turning now to FIG. 10D, FIG. 10D illustrates example operations performed by the profiling agent 203 to compact the cluster contention profile summary reports in a test debug run or in a periodic monitoring.

At step/operation 1024, the profiling agent 203 is configured to access the cluster contention reports from the repository 205 against various cluster settings.

At step/operation 1026, the profiling agent 203 is configured to create a compact cluster contention summary profile report by deriving a single statistically aggregated contention summary using all or a subset of contention reports from the past execution runs by utilizing the cluster contention compact summary creator 306 and the analytical contention models 307. An example analytical contention model 307 may include deriving a point estimate for the above-mentioned resource demand against hour of the day and day of the week. Alternatively or additionally, an analytical model with a confidence interval or tolerance interval against time and contextual information of co-occurring jobs and workflows may be created. The confidence interval or tolerance interval can be used to deduce not only a single value, but possibly a range or confidence bound run-time estimates.

At optional step/operation 1028, the profiling agent 203 may additionally be configured to purge all the cluster contention summary reports which have already been compacted.

At step/operation 1030, the profiling agent 203 is configured to store the compact historical cluster contention summary profile 308 in the repository 205. The compact historical cluster contention summary profile may be utilized by the prediction engine 207. The operations described in conjunction with FIG. 10D may be performed for multiple iterations.

Generating Predictions

FIG. 11A illustrates example operations performed by the run-time prediction engine 207 to generate a prediction comprising a remaining time to completion for a workflow. At step/operation 1102, the run-time prediction engine 207 is configured to create a set of DAGs of pipeline of operations for a given setup consisting of a set of scheduled or executing workflow's $N_W$ and a set of scheduled or executing job's $N_J$ by utilizing the DAG generator 508. FIG. 12A illustrates an example of set of scheduled workflows in a multi-tenant computing system such as a Hadoop platform. In the example illustrated in FIG. 12A, two tenant pools Q1 and Q2 are illustrated. Q2 includes workflow 2 which includes two MapReduce jobs $J_1^{W_2}$ and $J_2^{W_2}$. Q1 includes workflow 1 which includes three MapReduce jobs $J_1^{W_1}$, $J_2^{W_1}$, and $J_3^{W_1}$.

A MapReduce workflow is defined as an ensemble of MapReduce jobs organized as a DAG. In an example embodiment using Hadoop, a MapReduce workflow is a compiled flow of MapReduce jobs to be executed on Hadoop cluster given a PIG query. A MapReduce job comprises a pipeline of data processing elements connected in series, where the output of one pipeline is the input of the next one, both referenced herein as the map pipeline and the reduce pipeline. A pipeline constitutes of a number of individual tasks/units that can be executed in parallel called pipeline splits. A MapReduce job comprises a pipeline of data processing elements connected in series, where the output of one pipeline is the input of the next one. Details regarding creating a set of DAGs of pipeline is illustrated in FIG. 11B.

At step/operation 1122, the DAG generator 508 is configured to, for all the scheduled workflows $W_i$ of the set $N_W$ and all the scheduled jobs $J_i$ of the set $N_J$, use the workflow dependency tree to identify a DAG of jobs to be executed. For the set of single independent job $N_J$, the DAG generator 508 assumes a DAG of one node.

At step/operation 1124, the DAG generator 508 is configured to, for each job $J_i^{W_k}$ belonging to workflow $W_k$, break the schedule into a MapReduce pipeline, where a pipeline is a set of data processing elements of the job $J_i^{W_k}$ connected in a series and where the output on one pipeline is the input of the next one. For an example embodiment using Hadoop, a MapReduce job is partitioned into a map stage and a reduce stage. The map stage comprises 4 operations: (1) split, (2) record reader, (3) map runner, and (4) combiner. The reduce stage comprises 3 operations: (1) shuffle/copy, (2) sort, and (3) reduce runner.

At step/operation 1126, the DAG generator 508 is configured to create a DAG of pipeline of operations as indicated above where each operation of a pipeline is identified as a pipeline split. FIG. 12B illustrates an example of a DAG of pipeline splits for a MapReduce job. For illustration purpose, only the map and reduce processing are shown.

Turning back to FIG. 11A, at step/operation 1104, the run-time prediction engine 207 is configured to, for all the scheduled DAGs ($N_W+N_J$), estimate/identify the number of pipeline splits, including $m_{J_i}^{W_N}$ map tasks and $r_{J_i}^{W_N}$ reduces tasks and input cardinalities ($N_{p\_split}$) of each pipeline split by utilizing the pipeline estimator 510 and cardinality estimator 512. Cardinality and pipeline width estimation of a pipeline depends on the data sources on which the pipeline will operate. Therefore, estimation for a pipeline utilizes prior estimations of its parent.

In some embodiments, the run-time prediction engine 207 is configured to perform a traversal of the workflow DAG in a fashion such that before visiting a node, all parent nodes have been visited. One example way of performing such traversal is a breadth first traversal of the DAG. One example method of performing traversal on each pipeline node of the DAG in an embodiment using Hadoop is provided below:

a. If the current node represents a pipeline which is already completed, estimation is not required and can be skipped.
b. If the current node represents a map pipeline of a scheduled job $J_i^{scheduled}$, all the input sources should be already available in the underlying file system. The underlying file system could be an in-memory store or a distributed database. An example of the underlying file system is the Hadoop distributed file system.
   i. Number of map pipeline splits $m_{J_i^{scheduled}}^{W_N}$ can be obtained by reading the respective source metadata from the file system. An example of source meta data for the HDFS includes the chunk size, source file size, number of source files, configured minimum and maximum split size, and/or the like.
   ii. Map pipeline split cardinality $N_J$ scheduled, $m_i$ can be estimated as $S_{J_i^{scheduled}^{s_i,m_i}}/\phi_{J_i^{scheduled}^{s_i,m_i}}$, where
      1. $S_{J_i^{scheduled}^{s_i,m_i}}$ represents the input split size for a given existing input source $s_i$, which can be obtained by reading the respective source meta data from the file system.
      2. $\phi_{J_i^{scheduled}^{s_i}}$ represents the average record size of the respective source $s_i$. The average record size may be obtained from the jobs $J_i^{scheduled}$ profile summary report 314 generated by profiling agent 203.
c. If the current node represents a reduce pipeline of a scheduled/un-scheduled job $J_i^{any,m_i}$. The pipeline width and the cardinality of pipeline splits may depend on that of its parent map pipeline.
   i. Assuming a uniform key distribution of data, pipeline split cardinality of the reduce pipeline $J_i^{any,m_i+r_i}$ can be expressed as $f_i\emptyset_i/r_i$.
   ii. $f_i$ represents the filter ratio defined as the fraction of input data that the map process produces as output. For most practical purposes, $0 \leq f \leq 1$ holds. The filter ratio $f_i$ can be obtained from the jobs $J_i^{any}$ profile summary report 314.

iii. $Ø_i$ represents the total number of map input tuples (map pipeline cardinality), as calculated above.

iv. $r_i$ represents the total number of reducers.

d. If the current node represents a map pipeline of an un-scheduled job $J_i^{scheduled}$ and is waiting for parent jobs to complete, the number of map pipeline splits $m_{J_i^{unscheduled}}^{W_N}$ and map pipeline split cardinality $N_{J_i^{unscheduled},mi}$ may be estimated by estimating the cardinalities and size details of all the dependent sources. One example way to perform such estimating is provided below:

i. Estimation of input cardinalities $N_{J_i^{scheduled}}^{S_e}$ and input source size $S_{J_i^{scheduled}}^{S_e}$ may be performed for $\tilde{N}^{S_e}$ files of all the existing input sources $s_e$ of job $J_i^{unscheduled}$.

For all the job input sources that already exist, the input cardinalities and the input source size can be estimated using the metadata from the underlying file system as explained above. Example for the Hadoop distributed file system may include reading the file chunk size, block size, file size, and/or the like.

ii. Estimation of input cardinalities $N_{J_i^{unscheduled}}^{S_p}$ and input source size $S_{J_i^{unscheduled}}^{S_p}$ may be spread across $\tilde{N}^{S_p}$ files of all the non-existing input sources $s_p$ of job $J_i^{unscheduled}$, For the entire non-existing input source $s_p$, the input cardinalities and size can be estimated as the job output cardinality and the job output size for the respective parent job $J_p$. The process is explained below:

a. Job Output cardinality of the parent job $J_p$ can be estimated as $(Ø_p M_p)$, where a. $M_p$ represents the estimated transforming ratio of the job $J_p$, which can be defined as the fraction of input that the job $J_p$ produces as output. The transforming ratio $M_p$ of the job $J_p$ can be obtained from the jobs $J_p$ profile summary report 314 generated by profiling agent 203.

b. $Ø_p$ represents the total map input tuples of the job $J_p$ already calculated above.

b. Job Output size of the parent job $J_p$ can be estimated as $\theta_p (Ø_p M_p)$, where a. $M_p$ represents the estimated transforming ratio of the job $J_p$, which can be defined as the fraction of input that the job $J_p$ produces as output. The transforming ratio $M_p$ of the job $J_p$ can be obtained from the jobs $J_p$ profile summary report 314 generated by profiling agent 203.

b. $Ø_p$ represents the total map input tuples of the job $J_p$ already calculated above.

c. $\theta_p$ represents the estimated average reduce output record size of the job $J_p$, which can be can be obtained from the job's $J_p$ profile summary report 314 generated by profiling agent 203.

c. Job Output can be estimated for all $\tilde{N}^{S_p}$ files, where $\tilde{N}^{S_p}$ is equal to the number of reducers of the parent job $J_p$.

iii. Given $N_{J_i^{unscheduled}}^{S_e}, S_{J_i^{unscheduled}}^{S_e}$ for the existing sources for all $\tilde{N}^{S_e}$ files and $N_{J_i^{unscheduled}}^{S_p}, S_{J_i^{unscheduled}}^{S_p}$ for all the non-existing outputs of the parent jobs of all $\tilde{N}^{S_p}$ files, the number of map pipeline splits and the map pipeline split cardinality for the job $J_i^{unscheduled}$ may be estimated as:

1. If the underlying convergence operation is a standard pre-defined operator like joins, aggregates, and/or the like standard techniques and cost formulas from the query optimization literature can be used.

2. If the underlying convergence operation is not a standard pre-defined operation, cost formula for the convergence operation of the given user defined operation can be obtained from the job's $J_i^{unscheduled}$ profile summary report 314 generated by profiling agent 203.

3. Given the cost formula $f_{J_i}^m$ and $f_{J_i}^{N_m}$ for the job $J_i^{unscheduled}$ as identified using one of the above, the number of map pipeline splits and their individual split size can be estimated as $f_{J_i}^m(N_{J_i^{scheduled}}^{S_e}, S_{J_i^{unscheduled}}^{S_p}, S_{J_i^{unscheduled}}^{S_p}, \tilde{N}^{S_e}, \tilde{N}^{S_p})$ and $f_{J_i}^{N_m}(N_{J_i^{scheduled}}^{S_p}, S_{J_i^{unscheduled}}^{S_e}, N_{J_i^{unscheduled}}^{S_p}, S_{J_i^{unscheduled}}^{S_p}, \tilde{N}^{S_e}, \tilde{N}^{S_p})$, given all parent job and existing sources.

iv. An example on a Hadoop platform for a merge convergence operation given all the existing sources and parent jobs may be obtained as follows:

1. Map pipeline cardinality $N_{J_i^{unscheduled}}$ across all the splits would be $(N_{J_i^{unscheduled}}^{S_e} + N_{J_i^{unscheduled}}^{S_p})$;

2. The number of map pipeline splits $m_{J_i^{unscheduled}}^{W_N}$ and the respective map pipeline split cardinality can be obtained by reading the chunking configurations with estimated file size $(S_{J_i^{unscheduled}}^{S_e} + S_{J_i^{unscheduled}}^{S_p})$ spread across $\tilde{N}^{S_e}$ files and $\tilde{N}^{S_p}$ files for all the existing and parent sources.

At step/operation 1106, the run-time prediction engine 207 is configured to, by utilizing the cluster contention predictor 506, prepare a cost model for predicting unknown future contention for all the defined execution case scenarios $EC_i$.

A distributed compute cluster 100 in a multi-tenant shared setting is likely to dynamically scale up/down the resource allocation of the executing pipelines, on the introduction, termination, pre-emption and/or like of a MapReduce workflow across the cluster tenants. The resource allocation rules may be governed by the underlying scheduling policies in the compute cluster configuration 404. Hence, while estimating the execution schedule timeline, it is important to factor in the cluster contention at a given time in the schedule timeline.

In an example embodiment using Hadoop with a Hadoop YARN resource manager with a Fair Scheduler configuration, a new scheduled job on the cluster from any tenant will likely scale down the resource allocation of existing workflows across the entire cluster in order to fairly redistribute the resources. Similarly, a change like completion of a job may trigger a scaling up the resource allocation of other workflows.

The predicted cluster contention 507 may include an estimated cluster contention per tenant at a given time in the future. The estimated contention could depend on a number of run-time conditions as governed by the contention predictor 506. The cost model for predicting the unknown future contention per tenant can be defined as a function of the execution case scenario $EC_i$, the given simulated time $T_{simulated}$, and/or the like. An example way of generating the estimated contention may include an estimation of resource contention for a best possible run-time scenario $EC_{best}$. The contention can be predicted as $m_{Q_j}^{demand} = r_{Q_j}^{demand} = 0$ for all $Q_j$ at all the simulated time $T_{simulated}$.

$EC_{best}$ represents the execution case scenario for the best possible run-time of the given scheduled workflows. This would assume 0 outside contentions for the scheduled workflows, leading to the availability of all the resources to the scheduled workflows, subject to the underlying configured scheduling policies. $Ad_{Q_j}^{demand}$ and $r_{Q_j}^{demand}$ represents the predicted processing resource demands for the map and reduce pipeline. $Q_j$ represents the respective tenant pool. $T_{simulated}$ represents the simulated time in the future.

Another example of generating the estimated contention may include an estimation of resource contention for a worst case possible run-time scenario $EC_{worst}$. The contention can be predicted as $m_{Q_j}^{demand}=r_{Q_j}^{demand}=vcores_{capacity}$ for all $Q_j$ at all the simulated time $T_{simulated}$.

$EC_{worst}$ represents the worst possible run-time of the given scheduled workflows. This would assume the maximum contention possible for all the scheduled workflows, leading to scarcity/unavailability of the resources to the scheduled workflows, subject to the underlying system settings. $m_{Q_j}^{demand}$ and $r_{Q_j}^{demand}$ represents the predicted processing resource demands for the map and reduce pipeline. $Q_j$ represents the respective tenant pool. And $T_{simulated}$ represents the simulated time in the future.

Another example of generating the estimated contention may include an estimation of resource contention using statistical case scenario $EC_{statistical}$. The contention can be predicted using a point estimate value as offered by cluster contention summary 308 against a given set of dimensions like future time of execution $T_{simulated}$, co-occurring workflows $W_{running}$, and/or the like.

Alternatively or additionally, techniques such as confidence intervals may be used to offer a range of best estimated run-time contentions.

At step/operation 1108, the run-time prediction engine 207 is configured to prepare a cost function for the estimation of input tuples processed ($K_{p\_split}$) of a pipeline split by utilizing the processed cardinality estimator 517. The cost function of estimating the number of input tuples processed of a pipeline split of a job $J_i^{any}$ can be estimated as $\Sigma(T_{p\_split}^{spent}/\alpha_p \vartheta_i)$ for all the intervals of time spent with consistent slowdown factor $\vartheta_i$. In this example, $T_{p\_split}^{spent}$ represents an interval of time spent on the pipeline split with a consistent slowdown factor $\vartheta_i$, $\alpha_p$ represents the unit cost of processing per core of the pipeline p for the job $J_i^{any}$, and $\vartheta_i$ for a processor $P_i$ represents the slowdown factor introduced due to multiplexing of multiple logical resources to a given physical resource and $\vartheta_i$ may be obtained from cluster profiler 310. FIG. 12C illustrates an example of a timeline with the $K_{p\_split}$ estimated a number of times during the course of execution of the pipeline split.

At step/operation 1110, the run-time prediction engine 207 is configured to, by utilizing calibrator 514, calibrate the pipeline unit processing cost based at least in part on current contention information obtained from cluster contention summary 308. The pipeline's unit processing cost ($\alpha_p^{J_i}$) for a pipeline p and a job $J_i$ is defined as the amount of time required for a processor core $C_i$ to process an input tuple in a given pipeline p. The unit processing cost $\alpha_p^{J_i}$ can be represented as msec/tuple.

A pipeline's unit processing cost can be from the job profile summary report 314 which may include the processing cost from the past execution of the jobs on the cluster or from the test debug runs. The calibrator 514 calibrates the profiled unit processing cost from the historical runs according to the current speed of processing the pipeline. One example method of calibrating the profiled unit processing cost is provided below:

If the pipeline represents one of the unscheduled pipelines, which has no active contention reports, the calibrated unit processing cost would be equal to the profiled processing cost as obtained from the job profile summary report 314.

Second, if the pipeline represents one of the currently executing pipelines, which has active contention reports available. The calibrator 514 is configured to estimate the pipeline unit processing cost using the active contention reports. The executing contention average tuple processing cost ($\alpha_p^{J_i,executing}$) can be calculated as $(T_{p\_split}/N_{p\_split})/\vartheta_i$—where $T_{p\_split}$ represents the amount of time required to complete a pipeline split, $N_{p\_split}$ represents the input cardinality of the pipeline split, and $\vartheta_i$ is the cost function representing the slowdown factor introduced due to multiplexing of multiple virtual cores to a single physical core and $\vartheta_i$ may be provided by the cluster profiler 310.

In some embodiments, in order to decrease the impact of data skew within a pipeline, the calibrator 514 is configured to prepare a statistically aggregated value using all the splits of the pipeline executing on the same processor type $P_i$. The calibrator 514 may be configured to derive all the historically calculated unit processing cost ($\alpha_p^{J_i,historical}$) using the profile summary reports 314, which may include a number of unit processing costs based on a possible execution case scenario. One such example is a worst case unit processing cost. The calibrator 514 may also be configured to prepare an aggregated value of unit processing cost using the historical and active metrics available. An example for the best case unit processing cost can be estimated as $\min(\alpha_p^{J_i,running}, \alpha_p^{J_i,historical,EC_{best}})$. Another example for the worst case unit processing cost can be estimated as $\max(\alpha_p^{J_i,running}, \alpha_p^{J_i,historical,EC_{worst}})$. Another example for the statistical case unit processing cost can be estimated as $\text{avg}(\alpha_p^{J_i,running}, \alpha_p^{J_i,historical,EC_{statistical}})$.

At step/operation 1112, the run-time prediction engine 207 is configured to, by utilizing the pipeline split run-time cost estimator 516, prepare a cost function for the run-time estimation of a MapReduce pipeline split. The pipeline split run-time cost estimator 516 may predict the run-time to completion of a scheduled or an executing pipeline split.

The time remaining of a pipeline split can be defined as the product of the amount of work that the split must still perform and the speed at which the work will be done. The speed at which the remaining work will be done is a function of the available capacity and the given execution case scenario $EC_i$. The time remaining of a pipeline split for an execution case scenario $EC_i$ executing on a processor $P_i$ can be expressed as $T_{remaining}^{p\_split,EC_j}(N_{p\_split}-K_{p\_split})\vartheta_i$— $N_{p\_split}$ represents the total number of input tuples in the pipeline split in cardinality estimates 513, $K_{p\_split}$ represents the total number of input tuples processed so far for the given pipeline split, as predicted by the processed cardinality estimator 517, $\alpha_p^{EC_j}$ represents the estimated calibrated tuple processing cost of the pipeline split for the execution case scenario $EC_j$ and $\alpha_p^{EC_j}$ may be included in the calibrated costs 515 provided by the calibrator 514. Further, $\vartheta_i$ represents the consistent slowdown factor during the course of execution of the pipeline split on the processor $P_i$. The slowdown factor at a given time of execution in future is a cost function of the profiled cluster slowdown factor as provided by cluster profiler 310 and the perceived run-time condition at the time of execution in the future indicated by predicted cluster contention 507.

At step/operation 1114, the run-time prediction engine 207 is configured to, prepare a schedule simulation and prediction model 501 according to the current state of the compute cluster. The schedule simulation and prediction model may be configured to simulate the execution of the scheduled and executing MapReduce workflows and jobs in order to build the expected execution schedule and the timeline of important events of the schedule. In some embodiments, the simulation model closely mimics the internals of the underlying compute cluster 100 and scheduling policies in the compute cluster configuration 404 in order to estimate the resource distributions and the model may be initialized with the current state of the cluster.

In an embodiment using Hadoop, an example of the initialization of the schedule simulation and prediction model in the case of Hadoop YARN resource manager may include cluster configurations including the number of cores, number of virtual cores, number of worker nodes and respective configured capacities, tenant pool quotas, configured scheduler, and/or the like. An example of the initialization of the schedule simulation and prediction model may also include the compiled DAG 509. An example of the initialization of the schedule simulation and prediction model may also include DAG pipeline and pipeline estimates indicating the information regarding currently executing and the upcoming pipeline splits. The current assignment of pipeline splits onto cluster workers such as cardinality estimates, currently processed input tuples, current resource allocations, priorities, tenant pool assignments, and/or the like may also be included.

At step/operation 1116, the run-time prediction engine 207 is configured to, by utilizing the schedule simulation and prediction model 501, simulate execution of MapReduce workflows and jobs to build an expected execution scheduled timeline. The schedule simulation and prediction model 501 may be configured to estimate a possible unknown contention at a given future point of time in the simulation along with the known executing contention. The schedule simulation and prediction model 501 uses a cluster contention predictor 506 to estimate the possible unknown contention at a given future point of time in the simulation along with the known executing contention. The schedule simulation and prediction model 501 may also use pipeline split run-time cost estimator 516 for estimating the run-time of a pipeline split while simulating the expected execution schedule.

If the simulation model is initialized with the current state of the cluster, the status of workflow on the underlying compute cluster may be mimicked to build an expected execution schedule $ES_{EC_i}$ for a given execution case scenario $EC_i$. An example schedule simulation and prediction model 501 may include one or more simulated masters and a number of simulated workers with a defined resource capacity coordinating with each other to execute simulated tasks over a simulated timeline. The schedule simulation and prediction model 501 may utilize policies and various other metrics to build an execution schedule timeline by spawning the next set of simulated tasks as indicated by the DAG and using a simulated clock. The schedule simulation and prediction model 501 may also be initialized before the current contention using a number of executing simulated tasks. In some embodiments using Hadoop, the schedule simulation and prediction model 501 may be configured to perform the following simulations until all of the identified pipeline splits included in the compiled DAG 509 and pipeline estimates 511 are completed.

The schedule simulation and prediction model 501 may simulate a master which uses the underlying configured scheduling policies to schedule next task batch if the underlying system has more remaining capacity. An example of a task for the Hadoop platform is the map task constituting a pipeline of splitter, record reader, mapper runner and combiner. Similarly, another example of a task for the Hadoop platform is the reduce task constituting a pipeline of sort/shuffle, copy and reduce runner.

For the purpose of capacity estimation and scheduling of a next task batch for an execution case scenario $EC_i$ at a given simulated time in future $t_{simulated}$, the schedule simulation and prediction model 501 may utilize currently known contention from all the simulated workers. Examples include the number of executing tasks ($m_{J_i}^{W_N}$, $r_{J_i}^{W_N}$) of each type, memory occupancy of each executing task $$\left( Mem_{Task_{J_i W_N}^{m_i}}, Mem_{Task_{J_i W_N}^{r_i}} \right),$$

job priority of each executing task $$\left( Prio_{Task_{J_i W_N}^{m_i}}, Prio_{Task_{J_i W_N}^{r_i}} \right),$$

and/or the like. The current contention details can be obtained from compiled DAG 509, pipeline estimates 511 and active contention reports 403. The schedule simulation and prediction model 501 may also utilize predicted unknown contention from all the tenants excluding the currently known contention at $t_{simulated}$ for $EC_i$. The predicted unknown contention may be obtained from predicted cluster contention 507 generated by the cluster contention predictor 506. The schedule simulation and prediction model 501 may also utilize underlying compute cluster settings, capacity, configurations and scheduling policies in compute cluster configurations 404.

A schedule simulation and prediction model 501 also may include capacity estimation for the Hadoop platform with Job Tracker as the master responsible for resource assignment policies. The remaining capacity of a simulated worker $SW_i$ at a given simulated time in future $t_{simulated}$ can thus be calculated as $slot_{SW_i}^{map, \ total} - m_{SW_i}^{active} - m_{SW_i}^{PC}$. $slot_{SW_i}^{map, \ total}$ represents the total number of configured map slots for the given simulated worker as provided by compute cluster configurations 404. $m_{SW_i}^{active}$ give represents the total number of actively executing known map tasks at $t_{simulated}$, as included in pipeline estimates 511. Also, $m_{SW_i}^{PC}$ represents the unknown predicted contention for the map slots from all the tenants for the given simulated worker at $t_{simulated}$, as included in the predicted cluster contention 507. In some embodiments, distributed compute cluster 100 may be configured with resource manager scheduler like Fair Scheduler. Fair scheduler may make complex allocation decisions by factoring in inter-tenant and intra-tenant contention along with a respective weighting. Such a scheduler may factor in the known contention provided in pipeline estimates 511 and unknown contention included in predicted cluster contention 507 at a given time $t_{simulated}$. The simulated master also uses the dependency tree/DAG as included in compiled DAG 509 and pipeline estimates 511 to identify the next schedulable job and next waiting pipeline splits and respective tasks to be scheduled.

An example of scheduling policies for the resource allocation of next tasks on the simulated workers $SW_i$ is the fair scheduler. The fair scheduler assigns resources to the jobs in such a fashion, such that all the jobs will get, on average, an equal share of resources over time, subject to constraints such as pool weights, minimum and maximum pool quota, and/or the like.

All the simulated workers may estimate their closest simulated clock time $t_{b+1}$ in a manner such that a task batch $B_i$ from the set of scheduled tasks on the simulated worker will be completed. The simulated worker uses the simulated clock time $t_{b+1}$ to generate a task completion event to the simulated master. Element 516 would be used for the estimation of simulated clock time $t_{b+1}$ in which $(t_b, t_{b+1})$ represents a time frame during the course of execution of the schedule such that all the scheduled tasks on the simulated workers are executing with a consistent slowdown factor and $t_b$ represents the current system perceived time in the simulation.

The simulated master may process the task completion event by controlling the simulated clock to generate an execution schedule timeline $ES_{EC_i}$ as a series of buckets Bucket$_i$, where a bucket Bucket$_i$ represents a time frame of execution $(t_b, t_{b+1})$ as described above.

FIG. 12D illustrates an example of predicted execution schedule for multiple workflows. The predicted execution schedule illustrated in FIG. 12D is a timeline $ES_{EC_{best}}$ for a best case execution $EC_{best}$. Under the best case execution scenation, it is assumed that there is zero unknown predicted contention in predicted cluster contention 507.

At step/operation 1118, the run-time prediction engine 207 may be configured to predict the remaining time to completion for a given workflow and execution case scenario $EC_i$ by utilizing the run-time estimator 401. The run-time estimator 401 may generate the run-time (remaining time to completion) from the expected execution schedule timeline 409 by traversing the execution schedule timeline.

The remaining time to completion Time$_{remaining}^{EC_i}$ for a given workflow $W_N$ and given execution case scenario $EC_j$ can be estimated as $t_{end}^{W_N} - t_{prediction}$. In this example, $t_{end}^{W_N}$ represents the simulated clock time such that $(t_{end-1}^{W_N}, t_{end}^{W_N})$ time frame belongs to the last bucket Bucket$_i$ of the workflow $W_N$ on the execution pipeline $EP_{EC_i}$ and $EP_{EC_i}$ represents the simulated execution pipeline belonging to the given execution case scenario $EC_i$. Further, the $t_{prediction}$ represents the actual system time at the time of prediction. Example may include the system predicting multiple run-time estimates to completion like Time$_{remaining}^{EC_{best}}$, Time$_{remaining}^{EC_{statistical}}$, Time$_{remaining}^{EC_{worst}}$, and/or the like.

The run-time prediction may be utilized in several different types of derivatives. By way of example, run-time prediction may be utilized in SLA's monitoring and alerting system, resource allocation optimization, performance debugging, cluster tuning, capacity planning, administration and reporting, anomaly detection, optimal scheduling, etc.

Example Interfaces

FIG. 13 illustrates an example web interface 208A showcasing run-time estimates for workflow's executing on the distributed compute cluster. As illustrated by FIG. 13, the example web interface 208A shows the number of jobs completed, number of active jobs, number of completed workflows, and the number of active workflows. The example web interface 208A also shows the start time, workflow owner, and estimated time for completion or time taken for each workflow. The name of the workflows and an identification number of the workflows are also shown.

FIG. 14 illustrates an example of various run-time presented on the web interface 208A. The example showcases 4 estimated run-times: for best case scenario, worst case scenario, executing case estimates, and one using statistical trends. The example web interface 208A may be configured to show these various estimated run-times for each of the workflows completed or active.

FIGS. 15 to 18 illustrates example mobiles interfaces 208B showcasing run-time estimates for a workflow. The example mobiles interfaces 208B show a start time, a name, an identification number, progress estimation, an indication of start time, and an estimated time of arrival for the workflow.

Conclusion

Many modifications and other embodiments of the inventions set forth herein will come to mind to one skilled in the art to which these inventions pertain having the benefit of the teachings presented in the foregoing descriptions and the associated specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer implemented method for producing a run-time prediction for a MapReduce workflow against one or more execution case scenarios in a multi-tenant distributed computing system with one or more compute clusters, the computer implemented method comprising:
   receiving a MapReduce workflow, wherein the MapReduce workflow comprises one or more MapReduce jobs for execution via one or more compute clusters in the multi-tenant distributed computing system;
   generating a plurality of workflow profile summary reports associated with one or more currently executing workflows on the multi-tenant distributed computing system based at least in part on one or more current performance metrics of the one or more currently executing workflows;
   generating one or more compact historical workflow profile summary reports based at least in part on an aggregation of each of the plurality of workflow profile summary reports associated with the one or more currently executing workflows;
   generating one or more compact historical cluster contention summary reports based at least in part on an aggregation of each of a plurality of cluster contention summary reports, wherein the plurality of cluster contention summary reports profile a load for the one or more compute clusters;
   accessing one or more compute cluster configurations;
   generating a run-time prediction for the MapReduce workflow based at least in part on the one or more compact historical workflow profile summary reports, the one or more compute cluster configurations, and the one or more compact historical cluster contention summary reports, wherein the run-time prediction indicates a time to execute the MapReduce workflow; and providing at least a portion of the run-time prediction to a run-time prediction interface configured to display the run-time prediction or a notification of the run-time prediction.

2. The method of claim 1, wherein generating the plurality of workflow profile summary reports associated with the one or more currently executing workflows is based at least in part on one or more current performance metrics of the one or more compute clusters, and wherein the generating comprises:

individually generating one or more job profiles associated with the executing of the one or more MapReduce jobs of the MapReduce workflow;

generating one or more compute cluster profiles of the one or more compute clusters;

deriving one or more current performance metrics associated with executing the MapReduce workflow on each of the one or more compute clusters; and generating a workflow profile of the MapReduce workflow based at least in part on the one or more job profiles and the one or more current performance metrics.

3. The method of claim 1, wherein the MapReduce workflow is defined as a first MapReduce workflow, and wherein generating the one or more compact historical workflow profile summary reports comprises:

receiving a second MapReduce workflow having an identifier matching a first identifier associated with the first MapReduce workflow, wherein the second MapReduce workflow comprises one or more MapReduce jobs;

separately executing the second MapReduce workflow on the one or more compute clusters in the multi-tenant distributed computing system;

generating a second plurality of workflow profile summary reports associated with the second MapReduce workflow based at least in part on one or more current performance metrics of the one or more compute clusters; and generating the one or more compact historical workflow profile summary reports based at least in part on the one or more current performance metrics.

4. The method of claim 3, wherein generating the one or more compact historical workflow profile summary reports is based at least in part on the one or more current performance metrics of the one or more compute clusters and comprises:

individually generating one or more job profiles associated with the executing of the one or more MapReduce jobs of the second MapReduce workflow;

generating one or more compute cluster profiles of the one or more compute clusters;

deriving one or more current performance metrics associated with executing the second MapReduce workflow on each of the one or more compute clusters;

generating a workflow profile of the second MapReduce workflow based at least in part on the one or more job profiles and the one or more current performance metrics; and generating the one or more compact historical workflow profile summary reports based at least in part on an aggregation of each of the plurality of workflow profile summary reports associated with the one or more currently executing workflows and the workflow profile of the second MapReduce workflow and by deriving a statistically aggregated value for each of the one or more current performance metrics.

5. The method of claim 1, wherein the one or more current performance metrics comprise one or more of: one or more unit tuple processing costs, CPU (Central Processing Unit) time spent, one or more input and output metrics, memory usage, persistent storage space usage, a slowdown factor, or one or more network I/O usage.

6. The method of claim 3, wherein generating the second plurality of workflow profile summary reports is based at least in part on functional and performance metrics of one or more of: composing job profiles, convergence cost function of the one or more MapReduce jobs of the second MapReduce workflow, and/or the directed acyclic graphs of the second MapReduce workflow.

7. The method of claim 4, wherein generating the one or more compact historical workflow profile summary reports further comprises:

receiving a third MapReduce workflow having a third identifier matching a first identifier associated with the first MapReduce workflow;

generating a workflow profile of the third MapReduce workflow; and generating the one or more compact historical workflow profile summary reports based at least in part on an aggregation of the workflow profile of the second MapReduce workflow and the workflow profile of the third MapReduce workflow and by deriving a statistically aggregated value for each of the one or more current performance metrics.

8. The method of claim 1, wherein generating the one or more compact historical cluster contention summary reports comprises:

collecting current cluster load information representing resource contention of each of the one or more compute clusters;

generating the plurality of cluster contention summary reports based at least in part on the current cluster load information; and generating the one or more compact historical cluster contention summary reports based at least in part on an aggregation of the plurality of cluster contention summary reports and by deriving a statistically aggregated value for each of one or more contention metrics.

9. The method of claim 8, wherein the current cluster load information comprises one or more of: one or more CPU demand, one or more memory demand, one or more network I/O demand, one or more pipeline split execution demand, and one or more persistent storage space demand.

10. The method of claim 1, wherein generating a run-time prediction for the MapReduce workflow based at least in part on the one or more compact historical workflow profile summary reports, the one or more compute cluster configurations, and the one or more compact historical cluster contention summary reports comprises:

creating a set of currently executing directed acyclic graphs of one or more pipelines of operations for the one or more currently executing workflows on the multi-tenant distributed computing system;

creating a set of scheduled directed acyclic graphs of one or more pipelines of operations for one or more scheduled workflows on the multi-tenant distributed computing system, wherein the one or more scheduled workflows comprise at least one of: one or more workflows submitted for execution, one or more workflows not submitted for execution, or one or more workflows executed in the past and not currently executed;

identifying a number of currently executing pipeline splits and pipeline split attributes comprising input sources, cardinalities, tuple attributes for the set of currently executing directed acyclic graphs;

estimating a number of scheduled pipeline splits and pipeline split attributes comprising input sources, cardinalities, tuple properties for the set of scheduled directed acyclic graphs;

preparing a cost model for predicting unknown future contentions for a set of defined execution case scenarios using the one or more compact historical cluster contention summary reports, the one or more compute cluster configurations, and/or the one or more scheduled workflows and the one or more currently executing workflows;

preparing a cost model for predicting input tuples processed for the number of scheduled or the number of currently executing pipeline splits using the plurality of workflow profile summary reports associated with the one or more currently executing workflows, and the one or more compute cluster configurations;

generating one or more pipeline unit processing costs of the one or more scheduled workflows and the one or more currently executing workflows based at least in part on the one or more compact historical workflow profile summary reports, the plurality of workflow profile summary reports, the one or more compute cluster configurations and the one or more compact historical cluster contention summary reports;

preparing a cost model for predicting run-time estimates of the number of scheduled pipeline splits and the number of currently executing pipeline splits using at least one of: the plurality of workflow profile summary reports associated with one or more currently executing workflows, the one or more compact historical cluster contention summary reports, or the one or more compute cluster configurations;

preparing a schedule simulation model;

simulating the execution of the MapReduce workflow based at least in part on at least one of: the cost model for predicting unknown future contentions for the set of defined execution case scenarios, the cost model for predicting input tuples processed, the one or more pipeline unit processing costs, the cost model for predicting run-time estimates of the number of scheduled pipeline splits and the number of currently executing pipeline splits, the one or more compact historical workflow profile summary reports, the one or more compact historical cluster contention summary reports, or the one or more compute cluster configurations; and generating the run-time prediction for the MapReduce workflow based at least in part on the simulating the execution of the MapReduce workflow.

11. The method of claim 10, wherein generating one or more pipeline unit processing costs of the one or more scheduled workflows and the one or more currently executing workflows is based at least in part on the one or more compact historical workflow profile summary reports, the one or more compute cluster configurations, and/or the plurality of workflow profile summary reports and comprises:

preparing one or more currently executing cost functions for each of the number of currently executing pipeline splits for the set of currently executing directed acyclic graphs;

preparing one or more scheduled cost functions for each of the number of scheduled pipeline splits for the set of scheduled directed acyclic graphs; and generating the one or more pipeline unit processing costs using at least the one or more currently executing cost functions and the one or more scheduled cost functions.

12. The method of claim 1, further comprising:

updating the one or more compact historical cluster contention summary reports;

updating the plurality of workflow profile summary reports associated with the one or more currently executing workflows; and updating the run-time prediction for the MapReduce workflow based at least in part on the one or more updated compact historical cluster contention summary reports, and the updated plurality of workflow profile summary reports.

13. An apparatus comprising at least one processor, at least one memory storing computer program code, and at least one user interface, the at least one memory and the computer program code configured to, with the processor, cause the apparatus to at least:

receive a MapReduce workflow, wherein the MapReduce workflow comprises one or more MapReduce jobs;

generate a plurality of workflow profile summary reports associated with one or more currently executing workflows on the multi-tenant distributed computing system based at least in part on one or more current performance metrics of the one or more currently executing workflows;

generate one or more compact historical workflow profile summary reports based at least in part on an aggregation of each of the plurality of workflow profile summary reports associated with the one or more currently executing workflows;

generate one or more compact historical cluster contention summary reports based at least in part on an aggregation of each of a plurality of cluster contention summary reports, wherein the plurality of cluster contention summary reports profile a load for the one or more compute clusters;

access one or more compute cluster configurations;

generate a run-time prediction for the MapReduce workflow based at least in part on the one or more compact historical workflow profile summary reports, the one or more compute cluster configurations, and the one or more compact historical cluster contention summary reports, wherein the run-time prediction indicates a time to execute the MapReduce workflow; and provide at least a portion of the run-time prediction to a run-time prediction interface configured to display the run-time prediction or a notification of the run-time prediction.

14. The apparatus of claim 13, wherein generating the plurality of workflow profile summary reports associated with one or more currently executing workflows is based at least in part on one or more current performance metrics of the one or more compute clusters, and wherein the generating comprises:

individually generating one or more job profiles associated with the executing of the one or more MapReduce jobs of the MapReduce workflow;

generating one or more compute cluster profiles of the one or more compute clusters;

deriving one or more current performance metrics associated with executing the MapReduce workflow on each of the one or more compute clusters; and generating a workflow profile of the MapReduce workflow based at least in part on the one or more job profiles and one or more current performance metrics.

15. The apparatus of claim 13, wherein the MapReduce workflow is defined as a first MapReduce workflow, and wherein generating the one or more compact historical workflow profile summary reports comprises:

receiving a second MapReduce workflow having an identifier matching a first identifier associated with the first MapReduce workflow, wherein the second MapReduce workflow comprises one or more MapReduce jobs;

separately executing the second MapReduce workflow on the one or more compute clusters in the multi-tenant distributed computing system;

generating a second plurality of workflow profile summary reports associated with the second MapReduce workflow based at least in part on one or more current performance metrics of the one or more compute clusters; and generating one or more compact historical workflow profile summary reports based at least in part on the one or more current performance metrics.

16. The apparatus of claim 15, wherein generating the one or more compact historical workflow profile summary reports is based at least in part on the one or more current performance metrics of the one or more compute clusters and comprises:

individually generating one or more job profiles associated with the executing of the one or more MapReduce jobs of the second MapReduce workflow;

generating one or more compute cluster profiles of the one or more compute clusters;

deriving one or more current performance metrics associated with executing the second MapReduce workflow on each of the one or more compute clusters;

generating a workflow profile of the second MapReduce workflow based at least in part on the one or more job profiles and the one or more current performance metrics; and generating the one or more compact historical workflow profile summary reports based at least in part on an aggregation of each of the plurality of workflow profile summary reports associated with the one or more currently executing workflows and the workflow profile of the second MapReduce workflow and by deriving a statistically aggregated value for each of the one or more current performance metrics.

17. The apparatus of claim 13, wherein the one or more current performance metrics comprise: one or more unit tuple processing costs, one or more CPU (Central Processing Unit) time spent, one or more input and output metrics, one or more memory usage, one or more persistent storage space usage, a slowdown factor, or one or more network I/O usage.

18. The apparatus of claim 15, wherein generating the second plurality of workflow profile summary reports is based at least in part on functional and performance metrics of one or more of: composing job profiles, convergence cost function of the one or more MapReduce jobs of the second MapReduce workflow, and/or the directed acyclic graphs of the second MapReduce workflow.

19. The apparatus of claim 16, wherein generating the one or more compact historical workflow profile summary reports further comprises:

receiving a third MapReduce workflow having a third identifier matching a first identifier associated with the first MapReduce workflow;

generating a workflow profile of the third MapReduce workflow; and generating the one or more compact historical workflow profile summary reports based at least in part on an aggregation of the workflow profile of the second MapReduce workflow and the workflow profile of the third MapReduce workflow and by deriving a statistically aggregated value for each of the one or more current performance metrics.

20. The apparatus of claim 13, wherein generating the one or more compact historical cluster contention summary reports comprises:

collecting current cluster load information representing resource contention of each of the one or more compute clusters;

generating the plurality of cluster contention summary reports based at least in part on the current cluster load information; and generating the one or more compact historical cluster contention summary reports based at least in part on an aggregation of the plurality of cluster contention summary report and by deriving a statistically aggregated value for each of one or more contention metrics.

21. The apparatus of claim 20, wherein the current cluster load information comprises one or more of: one or more CPU demand, one or more memory demand, one or more network I/O demand, one or pipeline split execution demand, and one or more persistent storage space demand.

22. The apparatus of claim 13, wherein generating a run-time prediction for the MapReduce workflow based at least in part on the one or more compact historical workflow profile summary reports, the one or more compute cluster configurations, and the one or more compact historical cluster contention summary reports comprises:

creating a set of currently executing directed acyclic graphs of one or more pipelines of operations for the one or more currently executing workflows on the multi-tenant distributed computing system;

creating a set of scheduled directed acyclic graphs of one or more pipelines of operations for one or more scheduled workflows on the multi-tenant distributed computing system, wherein the one or more scheduled workflows comprise at least one of: one or more workflows submitted for execution, one or more workflows not submitted for execution, or one or more workflows executed in the past and not currently executed;

identifying a number of currently executing pipeline splits and pipeline split attributes comprising input sources, cardinalities, tuple attributes for the set of currently executing directed acyclic graphs;

estimating a number of scheduled pipeline splits and pipeline split attributes comprising input sources, cardinalities, tuple attributes for the set of scheduled directed acyclic graphs;

preparing a cost model for predicting unknown future contention for a set of defined execution case scenarios using the one or more compact historical cluster contention summary reports, the one or more compute cluster configurations, and/or the one or more scheduled workflows and the one or more currently executing workflows;

preparing a cost model for predicting input tuples processed for the number of scheduled pipeline splits or the number of currently executing pipeline splits using the plurality of workflow profile summary reports associated with the one or more currently executing workflows, and the one or more compute cluster configurations;

generating one or more pipeline unit processing costs of the one or more scheduled workflows and the one or more currently executing workflows based at least in part on the one or more compact historical workflow profile summary reports, the plurality of workflow profile summary reports, the one or more compute cluster configurations, and the one or more compact historical cluster contention summary reports;

preparing a cost model for predicting run-time estimates of the number of scheduled pipeline split and the number of currently executing pipeline splits using at least one of: the plurality of workflow profile summary reports associated with one or more currently executing workflows, the one or more compact historical cluster contention summary reports, or the one or more compute cluster configurations;

preparing a schedule simulation model;

simulating the execution of the MapReduce workflow based at least in part on at least one of: the cost model for predicting unknown future contentions for the set of defined execution case scenarios, the cost model for predicting input tuples processed, the one or more pipeline unit processing costs, the cost model for predicting run-time estimates of the number of scheduled pipeline splits and the number of currently executing pipeline splits, the one or more compact historical workflow profile summary reports, the one or more compact historical cluster contention summary reports, or the one or more compute cluster configurations; and generating the run-time prediction for the MapReduce workflow based at least in part on simulate the execution of the MapReduce workflow.

23. The apparatus of claim 22, wherein generating one or more pipeline unit processing costs of the one or more scheduled workflows and the one or more currently executing workflows is based at least in part on the one or more compact historical workflow profile summary reports, the one or more compute cluster configurations, and/or the plurality of workflow profile summary reports and comprises:

preparing one or more currently executing cost functions for each of the number of currently executing pipeline splits for the set of currently executing directed acyclic graphs;

preparing one or more scheduled cost functions for each of the number of scheduled pipeline splits for the set of scheduled directed acyclic graphs; and generating the one or more pipeline units processing cost using at least the one or more currently executing cost functions and the one or more scheduled cost functions.

24. The apparatus of claim 13, further configured to:

update the one or more compact historical cluster contention summary reports;

update the plurality of workflow profile summary reports associated with one or more currently executing workflows; and update the run-time prediction for the MapReduce workflow based at least in part on the one or more updated compact historical cluster contention summary reports and the updated plurality of workflow profile summary reports.

25. A computer program product comprising at least one non-transitory computer-readable storage medium having computer-readable program code portions stored therein, the computer-readable program code portions configured to:

receive a MapReduce workflow, wherein the MapReduce workflow comprises one or more MapReduce jobs;

generate a plurality of workflow profile summary reports associated with one or more currently executing workflows on the multi-tenant distributed computing system based at least in part on one or more current performance metrics of the one or more currently executing workflows;

generate one or more compact historical workflow profile summary reports based at least in part on an aggregation of each of the plurality of workflow profile summary reports associated with the one or more currently executing workflows;

generate one or more compact historical cluster contention summary reports based at least in part on an aggregation of each of a plurality of cluster contention summary reports, wherein the plurality of cluster contention summary reports profile a load for the one or more compute clusters;

access one or more compute cluster configurations;

generate a run-time prediction for the MapReduce workflow based at least in part on the one or more compact historical workflow profile summary reports, the one or more compute cluster configurations, and the one or more compact historical cluster contention summary reports, wherein the run-time prediction indicates a time to execute the MapReduce workflow; and provide at least a portion of the run-time prediction to a run-time prediction interface configured to display the run-time prediction or a notification of the run-time prediction.

* * * * *